(12) United States Patent
Endo et al.

(10) Patent No.: US 7,265,509 B2
(45) Date of Patent: Sep. 4, 2007

(54) ELECTRIC POWER STEERING APPARATUS

(75) Inventors: Shuji Endo, Gunma (JP); Yuho Aoki, Gunma (JP); Kenji Mori, Gunma (JP); Toru Sakaguchi, Gunma (JP); Sakae Nejo, Gunma (JP); Hideaki Okazaki, Gunma (JP); Lilit Kovudhikulrungsri, Gunma (JP)

(73) Assignee: NSK, Ltd., Tokyo (JP)

( * ) Notice: Subject to any disclaimer, the term of this patent is extended or adjusted under 35 U.S.C. 154(b) by 10 days.

(21) Appl. No.: 11/181,859

(22) Filed: Jul. 15, 2005

(65) Prior Publication Data

US 2006/0012323 A1    Jan. 19, 2006

(30) Foreign Application Priority Data

| Jul. 15, 2004 | (JP) | ............................. 2004-208257 |
| Jul. 28, 2004 | (JP) | ............................. 2004-220460 |
| Mar. 3, 2005 | (JP) | ............................. 2005-058671 |

(51) Int. Cl.
*H02P 7/00* (2006.01)

(52) U.S. Cl. ..................... 318/432; 318/609; 180/443; 180/446

(58) Field of Classification Search ................ 318/430, 318/432, 434, 439, 609, 610; 180/446, 443; 701/41, 100
See application file for complete search history.

(56) References Cited

U.S. PATENT DOCUMENTS

| 5,189,620 | A | * | 2/1993 | Parsons et al. ............. 701/100 |
| 5,257,828 | A | * | 11/1993 | Miller et al. ................. 180/446 |
| 5,475,289 | A | * | 12/1995 | McLaughlin et al. ........ 318/432 |
| 5,581,167 | A | * | 12/1996 | Kato et al. ................... 318/609 |
| 5,691,615 | A | * | 11/1997 | Kato et al. ................... 318/609 |
| 6,308,123 | B1 | * | 10/2001 | Ikegaya et al. ............... 701/41 |
| 6,324,452 | B1 | * | 11/2001 | Ikegaya ........................ 701/41 |
| 6,938,725 | B2 | * | 9/2005 | Fujioka et al. .............. 180/446 |
| 6,983,818 | B2 | * | 1/2006 | Fujioka et al. .............. 180/446 |
| 7,086,496 | B2 | * | 8/2006 | Kodama ..................... 180/446 |
| 7,091,684 | B2 | * | 8/2006 | Kobayashi et al. ......... 318/432 |
| 2004/0239280 | A1 | * | 12/2004 | Zhang et al. ............... 318/609 |
| 2005/0039971 | A1 | * | 2/2005 | Fujioka et al. .............. 180/402 |
| 2005/0103561 | A1 | * | 5/2005 | Endo et al. ................. 180/443 |
| 2005/0116677 | A1 | * | 6/2005 | Tsuruta et al. ............. 318/610 |
| 2005/0149341 | A1 | * | 7/2005 | Eguchi et al. ................. 705/1 |
| 2005/0200327 | A1 | * | 9/2005 | Ikeda et al. ................. 318/609 |
| 2005/0230180 | A1 | * | 10/2005 | Kodama ..................... 180/446 |
| 2006/0208683 | A1 | * | 9/2006 | Ide ............................. 318/609 |

FOREIGN PATENT DOCUMENTS

| EP | 709 277 A1 | 5/1996 |
| EP | 943 527 A2 | 9/1999 |
| EP | 1 072 498 A2 | 1/2001 |
| GB | 2 367 543 A | 4/2002 |
| JP | 2000-108916 A | 4/2000 |

* cited by examiner

*Primary Examiner*—Paul Ip
(74) *Attorney, Agent, or Firm*—Sughrue Mion, PLLC

(57) ABSTRACT

The present invention provides an excellent electric power steering apparatus in which torque ripple caused by a quantization error of a current control system generated in case of slow steering state and steering holding state, namely, vibration and noise on a steering wheel can be suppressed. A current controller in which a steady state gain of feedback control is a finite value is used so as to be capable of suppressing the vibration and noise. Further, according to the present invention, a smoothing filter is included in a current control system so that the quantization error is smoothed so that the torque ripple is suppressed.

17 Claims, 18 Drawing Sheets

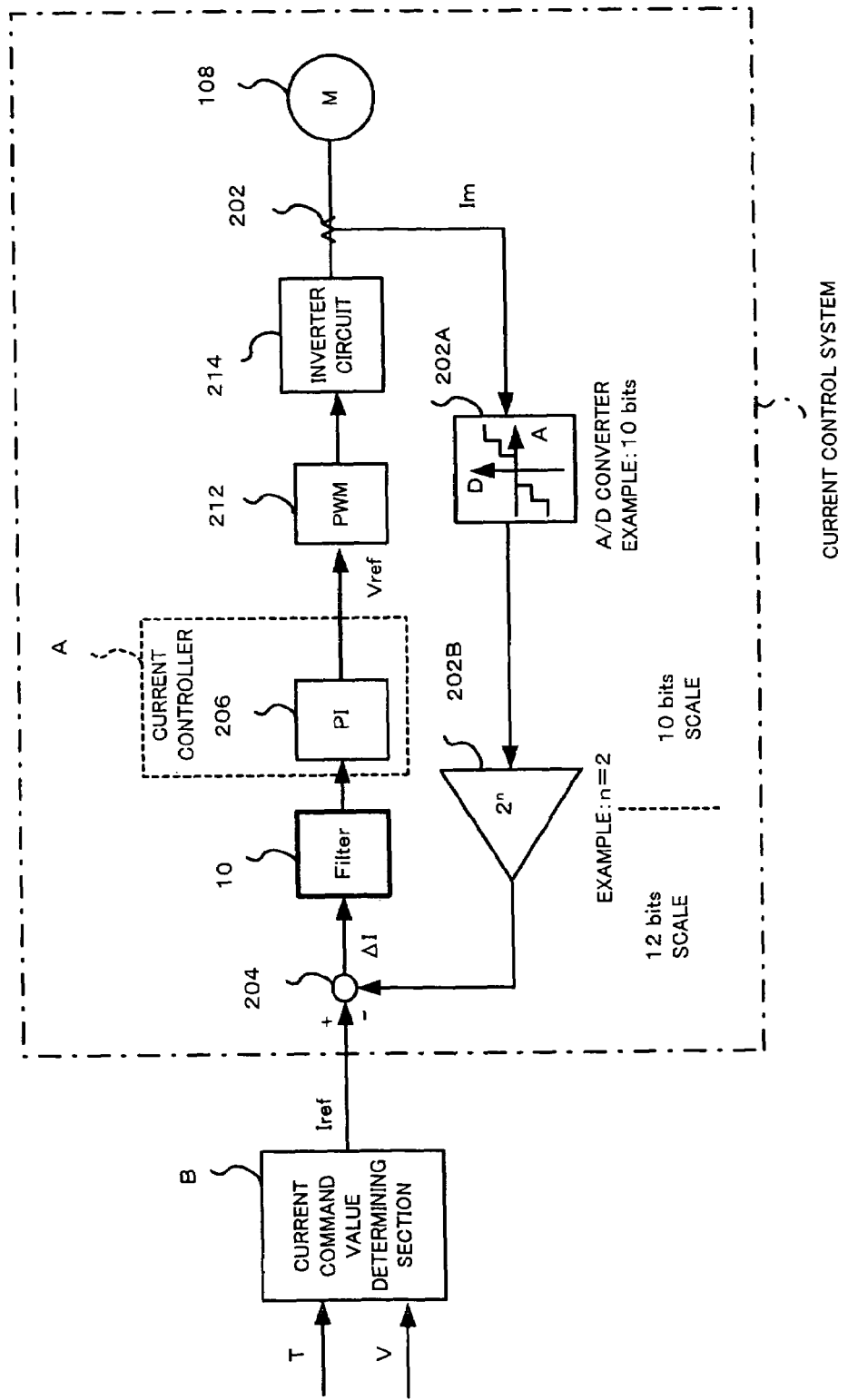

ELECTRIC POWER STEERING APPARATUS

BACKGROUND OF THE INVENTION

1. Field of the Invention

The present invention relates to an electric power steering apparatus, and particularly to the electric power steering apparatus with less vibration of a steering wheel and less noises, and with satisfactory steering feeling. Further, the present invention relates to the electric power steering apparatus having satisfactory steering feeling in which vibration and noise (hereinafter, called also as "steering holding noise") on a steering wheel in case of steering holding state can be reduced and a steering performance in a normal steering state (at the time of normal steering) can be secured.

2. Prior Art

Electric power steering apparatuses, which apply an assist torque to a steering apparatus of a vehicle by means of a rotation torque of a motor, apply the assist torque to a steering shaft or a rack shaft in such a manner a transmission mechanism such as gears or a belt applies a driving power of the motor via reduction gears. A simple constitution of such an electric power steering apparatus is explained with reference to FIG. 1.

A shaft 102 of a steering handle 101 is connected with a tie rod 106 of a steering wheel via reduction gears 103, universal joints 104a and 104b, and a pinion rack mechanism 105. The shaft 102 is provided with a torque sensor 107 that detects a steering torque of the steering handle 101, and a motor 108 that assists a steering torque of the steering handle 101 is connected to the shaft 102 via the reduction gears 103.

A control unit of the electric power steering apparatus having such a constitution is explained with reference to FIG. 2. A torque value T detected by the torque sensor 107 and a vehicle speed V detected by a vehicles speed sensor (not shown) are inputted to an assist map 190, and a steering assist command value is calculated. Further, a compensation value to be calculated by a compensation value calculating section 194 such as compensation values of convergence calculated by a convergence calculating section 191, inertia calculated by an inertia calculating section 192, self-aligning torque (SAT) and the like are added to the steering assist command value by adding sections 195, 196 and 197 so that a torque command value Tref is determined. A current command value calculating section 200 determines a current command value Iref based on the torque command value Tref. In a brushless motor, an angle of a rotor as well as the torque command value is inputted to the current command value calculating section 200, so that the current command value Iref is determined. A process portion up to the step of determining the current command value Iref based on the torque value T, the vehicle speed V and the compensation (portion surrounded by a broken line B) is called as a current command value determining section B for convenience.

On the other hand, a motor current Im to be supplied to the motor 108 is detected by a current detector 202, and it is inputted together with the current command value Iref to a subtracting section 204. The subtracting section 204 calculates an error ΔI=Iref−Im between them.

The error ΔI is inputted to a proportional-plus-integral (PI) control section as a current controller A surrounded by a broken line A. In this example, the error ΔI is inputted to a proportional section 208 as a proportional gain Kp and an integral section 206 as an integral gain Ki. An output from the proportional section 208 and an output from the integral section 206 are added by an adding section 210, and a voltage command value Vref is outputted.

A PWM (Pulse Width Modulation) control section 212 inputs the voltage command-value Vref therein, and outputs a PWM signal to an inverter circuit 214, so that the PWM signal based on the voltage command value Vref is instructed to the inverter circuit 214. The inverter circuit 214 supplies a motor current Im to the motor 108 based on the PWM signal.

The above explanation refers to the example where the proportional-plus-integral control is used in the current controller A in the control of the electric power steering apparatus. A steady state gain Gi relating to the proportional-plus-integral is expressed by the following equation 1.

$$|Gi| = \lim_{s \to o} (Kp + Ki/s) = \infty. \qquad \text{[Equation 1]}$$

That is to say, even when the error ΔI has a small value, the steady state gain Gi is infinite. For this reason, the voltage command value Vref is outputted as a large value even in case of steering holding state of a steering wheel or slow steering, and the following problems arise.

That is to say, recent electric power steering apparatuses provide high output, namely, large electric current, but A/D converters or the like which are used in control devices composed mainly of CPU have, for example, still 10 bits, and thus their resolution becomes relatively rough at the time of large current. A calculating error such as quantization error caused by the roughness of the resolution is amplified by a feedback gain, which is obtained when the steady state gain becomes infinite at the time when the error ΔI at the steering holding state or slow steering state is small, and it becomes vibration or noise of the steering wheel, thereby bringing discomfort to drivers.

In the control of the electric power steering apparatus, the integral control (I control), the proportional-plus-integral control (PI control) and proportional-plus-integral-plus-derivative control (PID control) as the current control section including an integral are generally used. In the control including the integral, however, since its gain becomes infinite in a steady state, in the case where the electric power steering apparatus is in the steady state, namely, the steering holding state or in the slow steering state, the driver feels vibration or noise via the steering wheel and the driver has discomfort about the steering of the steering wheel.

In Japanese Patent application Laid-open No. 2000-108916 A, in order to solve the above problems, in the feedback control, an adjustment gain is provided before the error ΔI=Iref−Im between the current command value Iref and the actual motor current Im is inputted to the control system including the integral element. When the error ΔI is small, the adjustment gain is reduced, and when the error ΔI is large, the adjustment gain is increased.

In the conventional apparatus, however, the design (threshold value) for determining the adjustment gain which changes according to the error of the electric current feedback is difficult, and the steady state gain of the integral element is infinite. For this reason, even if the adjustment gain is reduced, the total gain becomes large, and thus the problem such that the vibration and the noise generated in case of the steering holding state and slow steering state of the steering wheel is not solved.

Further, discrete time, fixed-point arithmetic and the like which are mounting problems in the case where the CPU is utilized as a control device are not taken into consideration.

SUMMARY OF THE INVENTION

The present invention is devised in view of the above circumstance, and it is an object of the present invention to provide an electric power steering apparatus with large capacity (high output) in which vibration and noise via a steering wheel are not generated even in case of steering holding state and slow steering state of the steering wheel and satisfactory steering of the steering wheel can be expected. Further, another object of the present invention is to provide an electric power steering apparatus having satisfactory steering feeling in which vibration and noise on a steering wheel in case of steering holding state can be reduced and a steering performance in a normal steering state can be secured.

The present invention relates to an electric power steering apparatus including: a motor that applies a steering assist torque to a steering system of a vehicle; a torque sensor that detects a steering torque which acts on a steering wheel; a current detector that detects an electric current of the motor; a current command value determining section that calculates a current command value Iref to be determined based on an output value from the torque sensor; and a current control section that controls the motor based on the current command value Iref and the electric current Im of the motor. An object of the present invention is achieved by that a current control system including the electric current Im of the motor has a smoothing filter.

Further, the present invention relates to an electric power steering apparatus including a motor that applies a steering assist torque to a steering system of a vehicle; a torque sensor that detects a steering torque which acts on a steering wheel; and a current detector that detects an electric current Im of the motor. The object of the present invention is achieved by having; a current command value determining section that calculates a current command value Iref to be determined based on an output value from the torque sensor; an error calculating section that calculates an error between the current command value Iref and the current value Im of the motor (Iref−Im); a smoothing filter that inputs the error therein; and a current control section including an integral element that inputs an output from the smoothing filter therein, and that the motor is controlled based on an output from the current control section.

Further, the present invention relates to an electric torque steering apparatus including: a motor that applies a steering assist power to a steering system of a vehicle; a torque sensor that detects a steering torque which acts on a steering wheel; and a current detector that detects an electric current of the motor, wherein the motor is feed-backed based on an output from a current controller for inputting an error between a current command value Iref to be determined based on an output value from the torque sensor and an electric current Im of the motor thereinto, and a gain of the current controller is a finite value. The object of the invention is achieved by that the gain of the current controller is a finite value.

Further, the object is achieved by that the current controller is comprised of at least a proportional function and a first order lag function.

More further, the present invention relates to an electric power steering apparatus including: a motor that applies a steering assist torque to a steering system of a vehicle; a current command value determining section that calculates a current command value Iref to be determined based on a vehicle speed and a torque as an output value from the torque sensor; a current detecting section that detects a motor current Im; and a current control section that outputs a voltage command value Vref. The object of the present invention is effectively achieved by including a steering state detecting section that detects a steering state of the steering wheel, outputs a steering holding state signal to the current control section when a steering holding state is detected, and does not output the steering holding state signal when a normal steering state is detected, and that the current control section inputs an error between the current command value Iref and the motor current Im, switches current control responsiveness according to the steering state detected by the steering state detecting section, and determines the voltage command value Vref based on the switched current control responsiveness and the error.

BRIEF DESCRIPTION OF THE DRAWINGS

In the accompanying drawings:

FIG. 9 is a block diagram showing the embodiment-6 of a control unit of the electric power steering apparatus according to the present invention;

DESCRIPTION OF THE PREFERRED EMBODIMENTS

Various embodiments of the present invention are explained below with reference to drawings.

Embodiment-1

Figure 3:
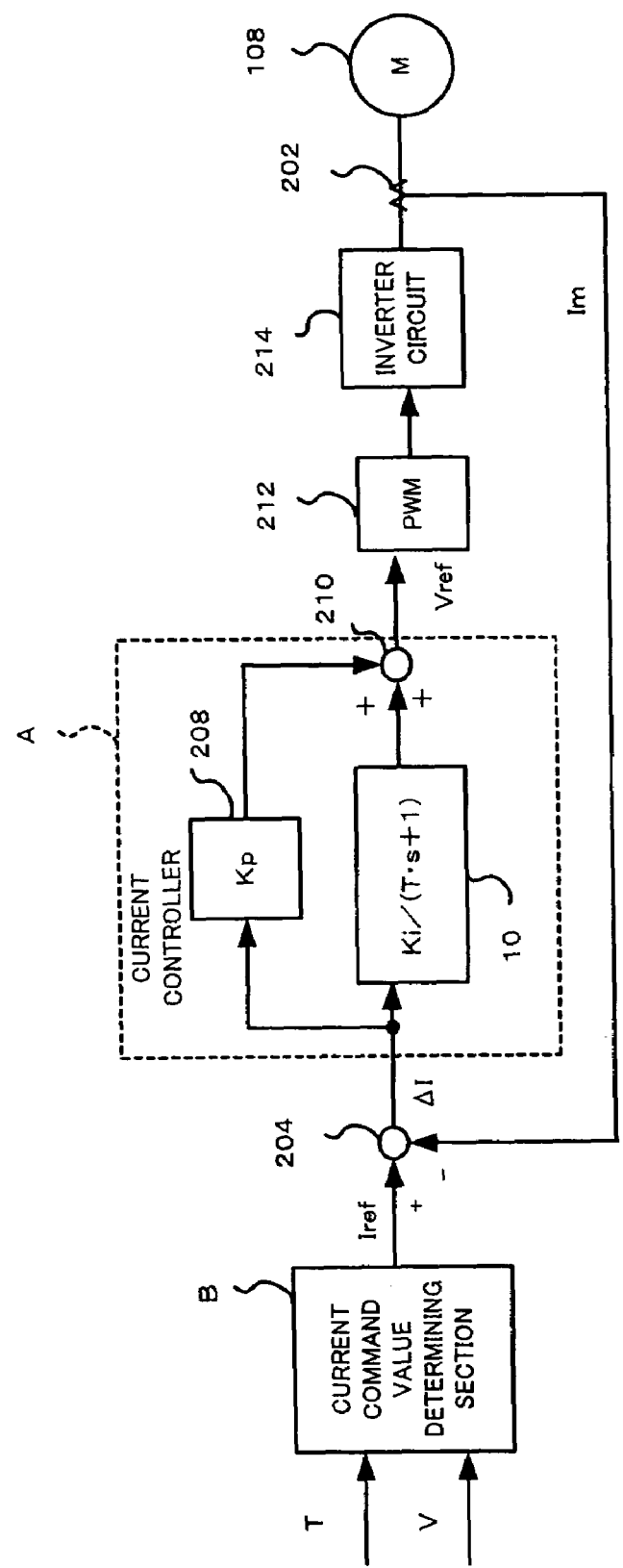
FIG. 3 is a block diagram showing the embodiment-1 of a control unit of the electric power steering apparatus according to the present invention.

FIG. 3 illustrates an example using a first order lag function as one example where a steady state gain of a current controller A is a finite value. A first order lag function section 10 uses "Ki/(T·s+1)" as a function example.

In FIG. 3, a current command value determining section B inputs a torque value T detected by a torque sensor 107, a vehicle speed V detected by a vehicle speed sensor and an auxiliary value therein, and determines a current command value Iref. Meanwhile, a motor current Im to be supplied to a motor 108 is detected by a current detector 202 and is inputted together with the current command value Iref to a subtracting section 204. The subtracting section 204 calculates their error ΔI=Iref−Im.

The error ΔI is inputted to a current controller A. In this example, the error ΔI is inputted to a proportional section 208 and a first order lag function section 10. An output from the proportional section 208 and an output from the first order lag function section 10 are added by an adding section 210 so that a voltage command value Vref is outputted. A PWM control section 212 inputs the voltage command value Vref therein, and outputs a PWM signal to an inverter circuit 214 so as to instruct the PWM signal based on the voltage command value Vref to the inverter circuit 214. The inverter circuit 214 supplies the motor current Im to the motor 108 based on the PWM signal.

A characteristic of the control of the electric power steering apparatus having such a constitution is that a steady state gain Gd of the first order lag function section 10 is a finite value. That is to say, this meaning can be expressed by the following equation 2.

$$|Gd| = \lim_{s \to o} (Kp + Ki/(T \cdot s + 1)) = Kp + Ki \qquad \text{[Equation 2]}$$

That is to say, the steady state gain Gd obtains a finite value "Kp+Ki". In the electric power steering apparatus, the equation 2 means that in the case where the steering wheel in the steady state is in the steering holding state or is steered slowly, the error ΔI is small, and even if the error ΔI is multiplied by the finite value gain Gd, the voltage command value Vref as its output obtains very smaller value than the voltage command value Vref when the error ΔI is multiplied by the infinite gain Gi including the integral. When this case is compared with the case of the current controller including the integral where the steady state gain is infinite, in the case of the current controller where the steady state gain is a finite value, the driver neither feels the vibration and noise via the steering wheel nor has discomfort about the operation of the steering wheel. Such an excellent effect can be expected. Particularly a high-output electric power steering apparatus with large current value (rough resolution) per bit can produce the great effect.

Embodiment-2

Another embodiment where the steady state gain of the current controller A is a finite value is explained below with reference to FIG. 4. In this embodiment, a lead/lag function is used as the function of the current controller A. A function (L·s+R)/(T·s+a) is used as one example of the lead/lag function. "L" designates an inductance value of the motor 108, "R" designates a resistance value of the motor 108, "T" designates a time constant and "a" designates a constant. The steady state gain Gad of the lead/lag function is expressed by the following equation 3.

$$|Gad| = \lim_{s \to o} (L \cdot s + R)/(T \cdot s + a) = R/a \qquad \text{[Equation 3]}$$

The steady state gain Gad=R/a may be set so that the vibration and noise are not generated in the steering wheel in case of the steering holding state or the slow steering state of the steering wheel.

A constitution of the embodiment-2 is explained with reference to FIG. 4. The torque value T detected by the torque sensor 107, the vehicle speed V detected by the vehicle speed sensor and the auxiliary value are inputted to the current command value determining section B, and the current command value Iref is determined. Meanwhile, the motor current Im to be supplied to the motor 108 is detected by the current detector 202 and is inputted together with the current command value Iref to the subtracting section 204. The subtracting section calculates their error ΔI=Iref−Im. The error ΔI is inputted to the current controller A. The current controller A is comprised of the lead/lag function section 20. The lead/lag function section 20 into which the error ΔI is inputted outputs the voltage command value Vref.

The PWM control section 212 inputs the voltage command value Vref and outputs a PWM signal to the inverter circuit 214, so as to instruct the PWM signal based on the voltage command value Vref to the inverter circuit 214. The inverter circuit 214 supplies the motor current Im to the motor 108 based on the PWM signal.

Figure 4:
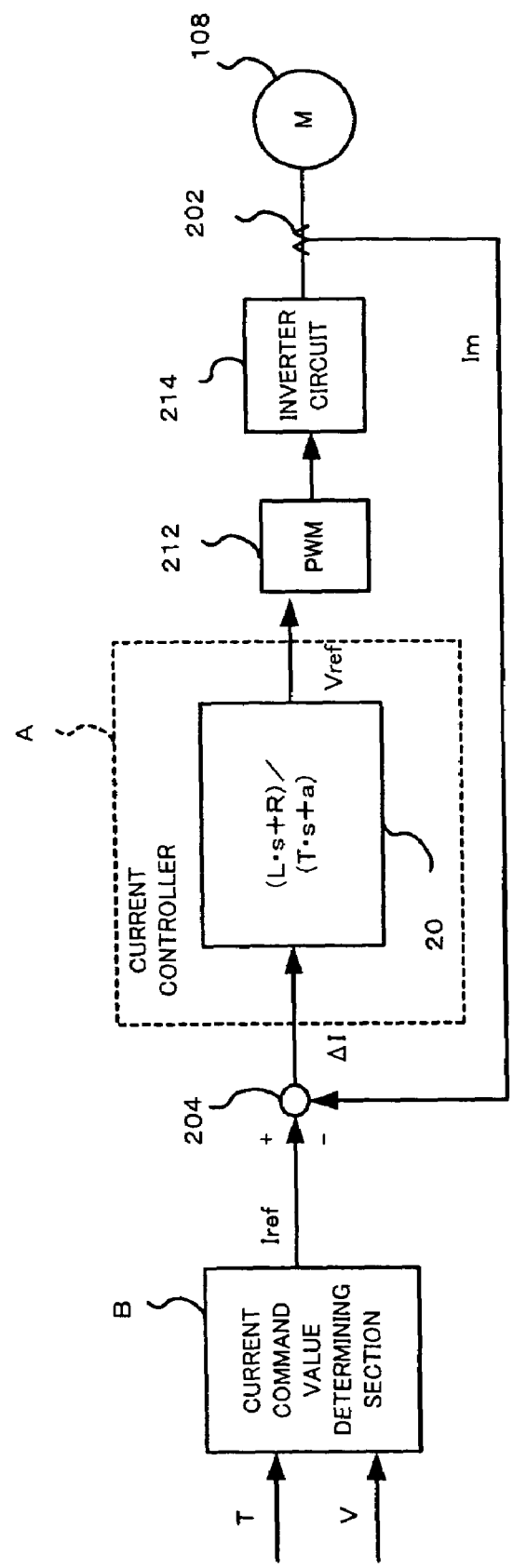
FIG. 4 is a block diagram showing the embodiment-2 of a control unit of the electric power steering apparatus according to the present invention.

A difference between the embodiment-2 in FIG. 4 and the embodiment-1 in FIG. 3 is the portion of the current controller A. The embodiments-1 and -2 are similar in that the steady state gain of the current controller A has a finite value. In the embodiment-2, the voltage command value Vref, which is obtained by multiplying "R/a" for determining the steady state gain Gad of the lead/lag function section 20 and the error ΔI in case of the steering holding state or slow steering state, is set to a value such that the driver does not feel the vibration and noise via the steering wheel. For this reason, in case of the steering holding state or the slow steering state, the driver does not feel the vibration and the noise via the steering wheel. The reason why the constant "a" is set to be as small as possible so that the vibration and noise are not generated is because as the constant "a" is smaller, the control which is closer to the integral control can be made. That is to say, while the advantage of the integral control is being utilized, consideration is given to the value of the steady state gain so that the vibration and noise are not generated.

Embodiment-3

Figure 5:
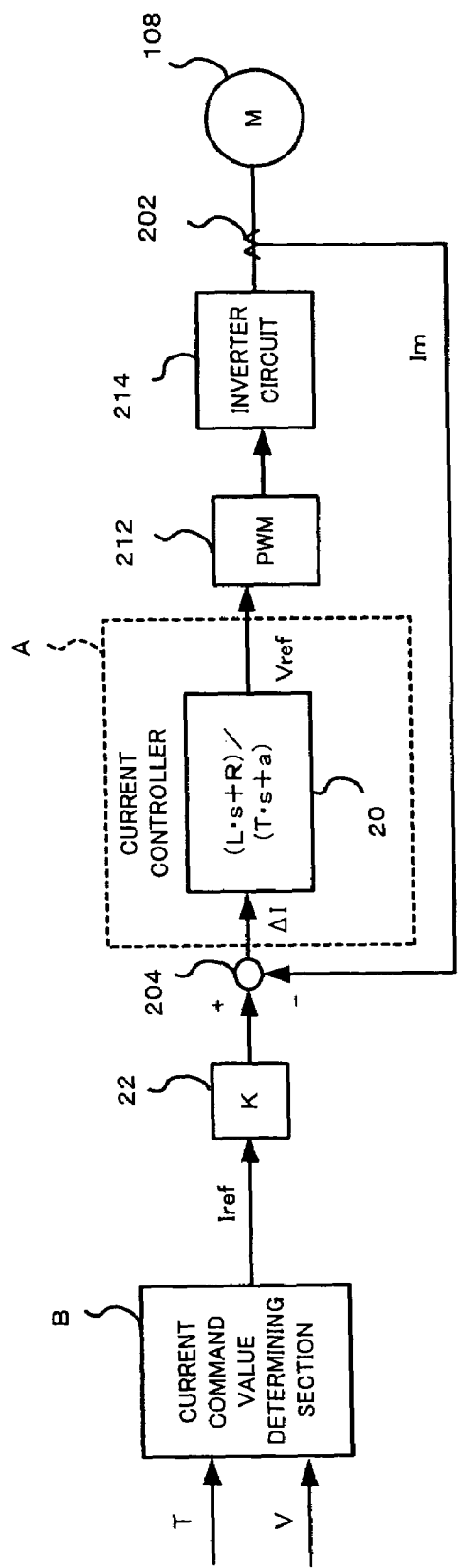
FIG. 5 is a block diagram showing the embodiment-3 of a control unit of the electric power steering apparatus according to the present invention.

An embodiment-3 shown in FIG. 5 is an embodiment where a gain which corrects the feedback gain of the embodiment-2 is provided. That is to say, in the constitution of the embodiment-2 in FIG. 4, a gain section 22 having a gain "K" is arranged between the current command value determining section B and the subtracting section 204.

The gain of a current feedback control loop is theoretically "1/(1+a)" which is smaller than "1". Since the constant "a" is set to be as small as possible so that the vibration and noise are not generated, the gain "1/(1+a)" becomes about "1". In the case of the high-output electric power steering apparatus, since the motor current value is large, for example, a rated current becomes 100A, even when the constant "a" is, for example, "0.01", the current error cannot be ignored. In the case where, therefore, the influence of the gain cannot be ignored, the gain section 22 is arranged so as to correct the gain K, thereby adjusting the influence of the gain "1/(1+a)". In this case, the value of the gain K is theoretically "1+a", but since it is influenced by a battery voltage, the resistance value of the motor or the like, it is preferable that the value is determined by experiment.

Embodiment-4

The sensitivity to the vibration and noise of the steering wheel is influenced by the vehicle speed and the rotating speed of the motor. That is to say, since the driver is worried about the vibration and noise particularly at the time of the low-speed running, in this embodiment-4, the feedback gain of the current controller A is changed by the vehicle speed and the rotating speed of the motor.

Figure 6:
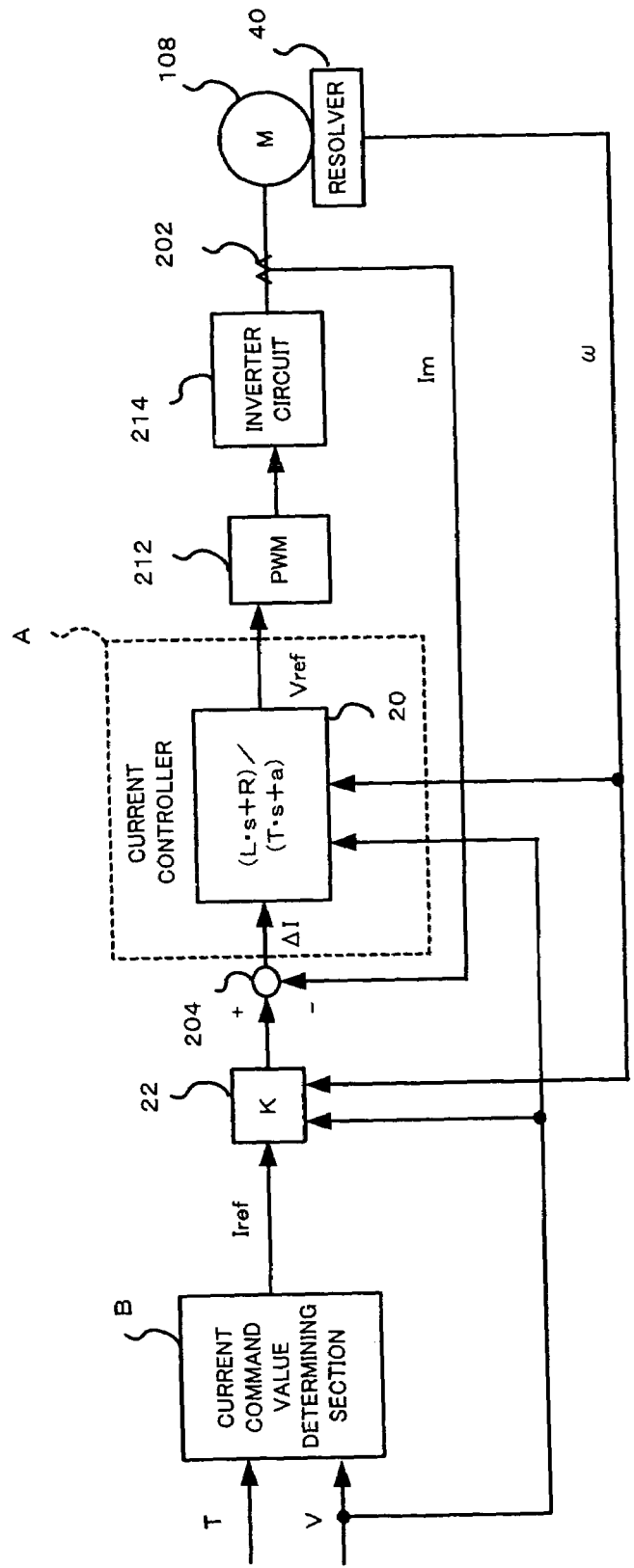
FIG. 6 is a block diagram showing the embodiment-4 of a control unit of the electric power steering apparatus according to the present invention.

In FIG. 6, a resolver 40 as one example is arranged at the motor 108 so as to detect an angular velocity $\omega$ of the motor 108. The angular velocity $\omega$ of the motor 108 detected by the resolver 40 and the vehicle speed V detected by the vehicle speed sensor are inputted to the gain section 22 and the lead/lag function section 20 of the current controller A. That is to say, when the vehicle speed V is high or the rotating speed $\omega$ of the motor 108 is high, the driver is not much worried about the vibration and noise, and thus even when the gain K of the gain section 22 is reduced or the constant "a" of the lead/lag function section 20 is reduced, the driver does not have discomfort about the operation of the steering wheel. In the case where, therefore, the gain of the current controller A or the like can be adjusted according to the vehicle speed V and the angular velocity $\omega$ of the motor 108, when the vehicle speed V is low or the rotating speed $\omega$ of the motor 108 is low, the gain which lays emphasis on the vibration and noise, namely, the constant "a" is increased and also the gain K is increased. When the vehicle speed V is high or the rotating speed $\omega$ of the motor 108 is high, the gain which lays emphasis on high-speed steering property, namely, the constant "a" is decreased and also the gain K is decreased. For this reason, the electric power steering apparatus, in which the high-speed steering property is being secured and simultaneously the vibration and noise are reduced, can be provided.

Embodiment-5

Figure 7:
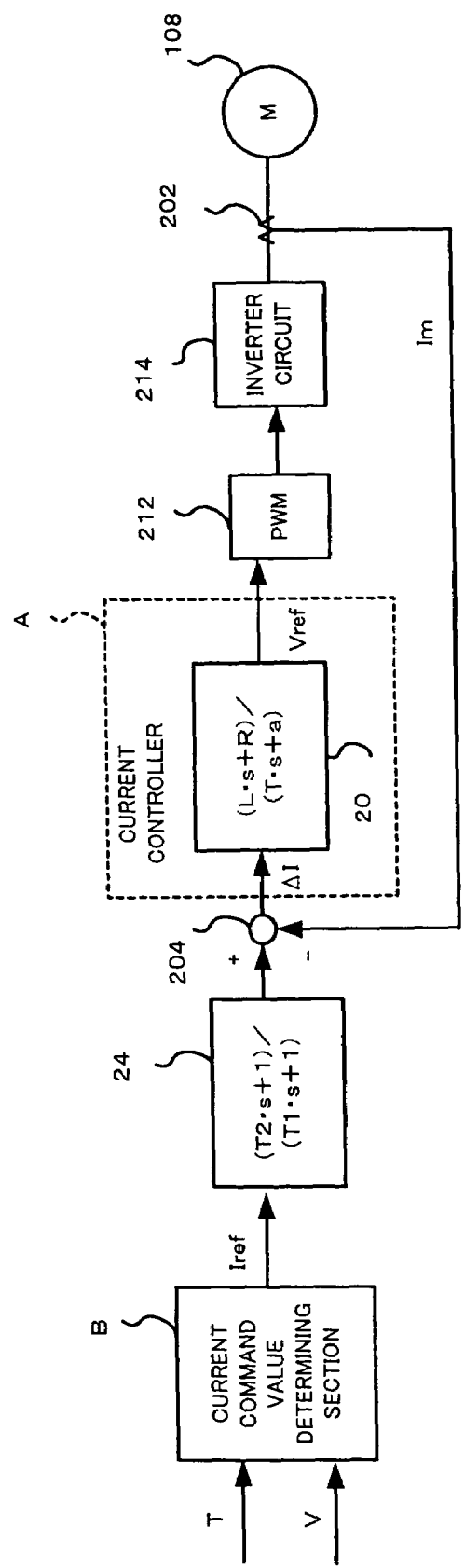
FIG. 7 is a block diagram showing the embodiment-5 of a control unit of the electric power steering apparatus according to the present invention.

The control constitution which can suppress the vibration and noise of the steering wheel and simultaneously can secure the high-speed steering property includes an embodiment-5 shown in FIG. 7 as well as the embodiments explained above. That to say, a lag of a high-speed steering responsibility, which is caused by the constant "a" of the lead/lag function section 20 in the current controller A, is compensated.

That is to say, in the high-output electric power steering apparatus where the current value is large (resolution is rough) per bit, when the error $\Delta I$ between the current command value Iref and the actually measured motor current Im is approximately zero, the current controller A responses sensitively, so that the vibration and noise are occasionally generated. For this reason, the gain of the current controller A is suppressed so that the vibration and noise are suppressed, and as a result, the responsibility at the time of the reduced high-speed steering is compensated by a phase compensator. Since the resolution is low in this embodiment-5, the influence of the quantization error is not propagated as possible as.

Concretely, in FIG. 7, a phase compensator 24 as a feed-forward element (as an example of a phase compensating function "(T2·s+1)/(T1·s+1)" is arranged instead of the gain section 22 between the current command value determining section B and the subtracting section 204. According to this constitution, so-called two-degree-of-freedom control can be made.

With this constitution, the constant "a" of the lead/lag function section 20 in the current controller A can obtain a large value, the responsibility at the time of the high-speed steering can be satisfactory, and the vibration and noise which are generated in case of the steering holding state or the slow steering state can be reduced.

Figure 8:
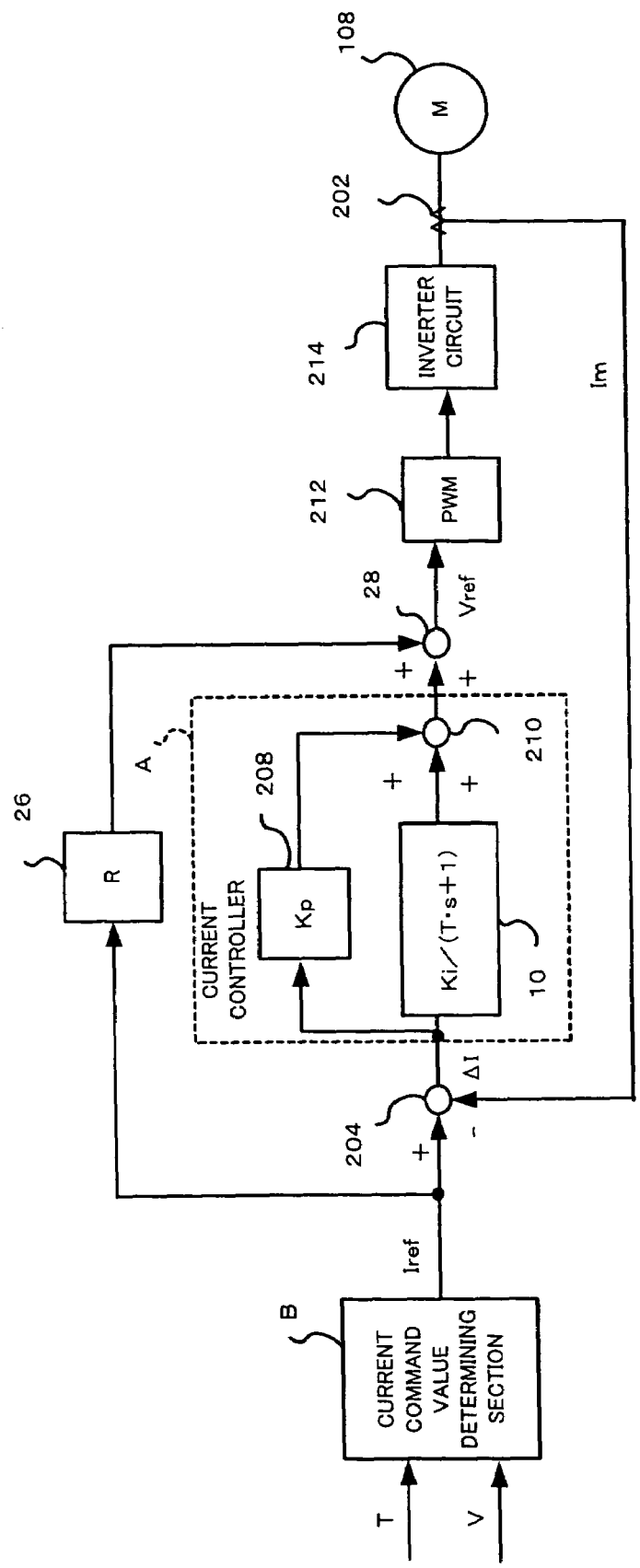
FIG. 8 is a block diagram showing a modified example of the embodiment-5.

A modified example of the embodiment-5 having the control constitution such that the vibration and noise of the steering wheel are suppressed and simultaneously the high-speed steering property can be secured includes an example shown in FIG. 8. The current controller A which inputs the error $\Delta I$ therein is the same as the current controller A in the embodiment-1 (however, the parameters Kp, Ki and T are different), but the gain section 26 which singularly multiplies the current command value Iref by the gain R is arranged, and the output from the current controller A and the output from the gain section 26 are added by the adding section 28, so that the voltage command value Vref is calculated.

The intention of the embodiment is such that the gain for the error $\Delta I$ for causing the vibration and noise is reduced, namely, the gain of the current controller A is reduced, and the responsibility at the time of high-speed steering is improved by the gain R of the gain section 26 instead of the phase compensator 24 for improving the responsibility in the embodiment-5. The gain R is the resistance of the motor 108, and "R" which is dominant value in the numerator "L·s+R" of the lead/lag function section 20 is used. When the dominant control amount comes out of the current feedback loop, a control amount of the current controller A is reduced, so that the generation of the vibration and noise can be reduced.

In the above explanation, it goes without saying that even when the motor which is used in the electric power steering apparatus is a single-phase motor and a three-phase motor, and when the control of the three-phase motor is three-phase control or d-q axis control, the effects of the present invention can be produced.

According to the present invention, the electric power steering apparatus, in which the vibration and noise of the steering wheel in case of steering holding state or the slow steering state are suppressed and the steering is satisfactory, can be provided.

According to the present invention (Embodiments-1 to -5), since the current controller whose steady state gain is a finite value is used, an output torque due to the error does not becomes large in case of the steering holding state and slow steering state of the steering wheel. For this reason, the electric power steering apparatus, in which vibration and noise via the steering wheel are not generated, and thus the satisfactory steering of the steering wheel can be expected, can be provided.

Further, the gain can be adjusted according to the vehicle speed and the motor rotational angular velocity, and the phase compensator is used, so that the vibration and noise of the steering wheel at the time of steering are suppressed and simultaneously the high-speed steering can be carried out.

Embodiment-6

In FIG. 9, a current command value determining section B inputs a torque value T detected by a torque sensor 107, a vehicle speed V detected by a vehicle speed sensor and an auxiliary value therein, and determines a current command value Iref. Meanwhile, after a motor current Im to be supplied to a motor 108 is detected by a current detector 202, the motor current Im is analog-to-digital (A/D) converted by an A/D converter 202A as one example with 10 bits, and its bit scale is raised from 10 bits to the 12 bits by a digit shift section 202B. The reason why the bit scale is raised from 10 bits to 12 bits (the position of a fixed point is raised) is because resolution of software is improved so that the electric current is controlled. The motor current Im whose bit scale is raised to 12 bits is inputted together with the current command value Iref to a subtracting section 204. The subtracting section 204 calculates their error ΔI=Iref−Im.

The error ΔI is inputted to a smoothing filter 10 which is a main section of the present embodiment-6. The smoothing filter 10 is for smoothing a step-shaped signal whose resolution is improved as software. An output from the smoothing filter 10 is inputted to a current controller A including an integral section, for example, a proportional-plus-integral section 206 such as a function "Kp+Ki/s", and a voltage command value Vref is outputted from the current controller A.

A PWM control section 212 inputs the voltage command value Vref therein, and outputs a PWM signal to an inverter circuit 214 so as to instruct the PWM signal based on the voltage command value Vref to the inverter circuit 214. The inverter circuit 214 supplies the motor current Im to the motor 108 based on the PWM signal.

A current control system in FIG. 9 operates based on the motor current Im detected by the current detector 202, and is comprised of the A/D converter 202A, the digit shift section 202B, the subtracting section 204, the smoothing filter 10, the current controller A (PI control section 206), the PWM control section 212, the inverter circuit 214 that supplies the motor current Im and the motor 108.

A characteristic of the control of the electric power steering apparatus having such a constitution is that when a steering wheel is steered slowly or its steering is retained, the error ΔI has a very small value (1 to 2 bits), and thus a quantization error which is caused at the time of quantizing the motor current Im detected by the current detector 202 greatly influences the value of the error ΔI. If the smoothing filter 10 is not present, the step-shaped error is greatly amplified by a steady state gain (theoretically the gain which becomes infinite) of the current controller A including the integral section, and the error appears as torque ripple of the motor output, thereby generating vibration and noise on the steering wheel. The presence of the smoothing filter 10, however, smoothes the quantization error of the motor current included in the error ΔI so as to be capable of preventing sensitive response of the current controller A. As a result, the torque ripple included in the output from the motor is greatly reduced, a driver does not feel the vibration and noise via the steering wheel, and thus an excellent effect that the driver does not have discomfort over the operation of the steering wheel can be expected. Particularly in the high-output electric power steering apparatus where the current value is large per bit (resolution is rough or low), the great effect can be expected.

Figure 1:
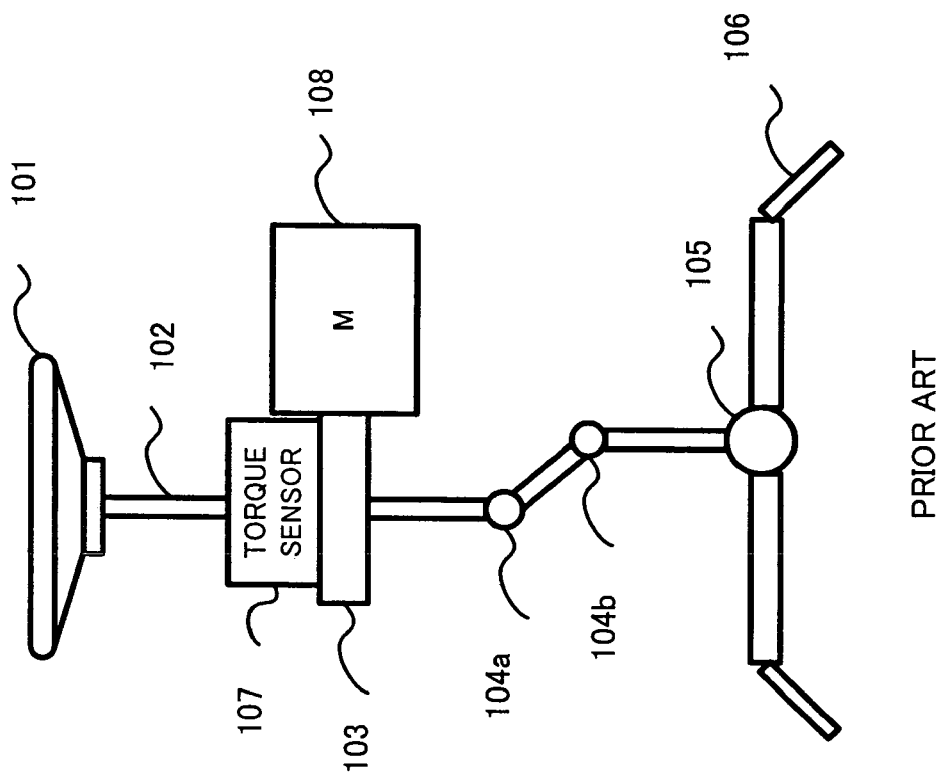
FIG. 1 is a constitutional diagram of showing a conventional electric power steering apparatus.
Figure 2:
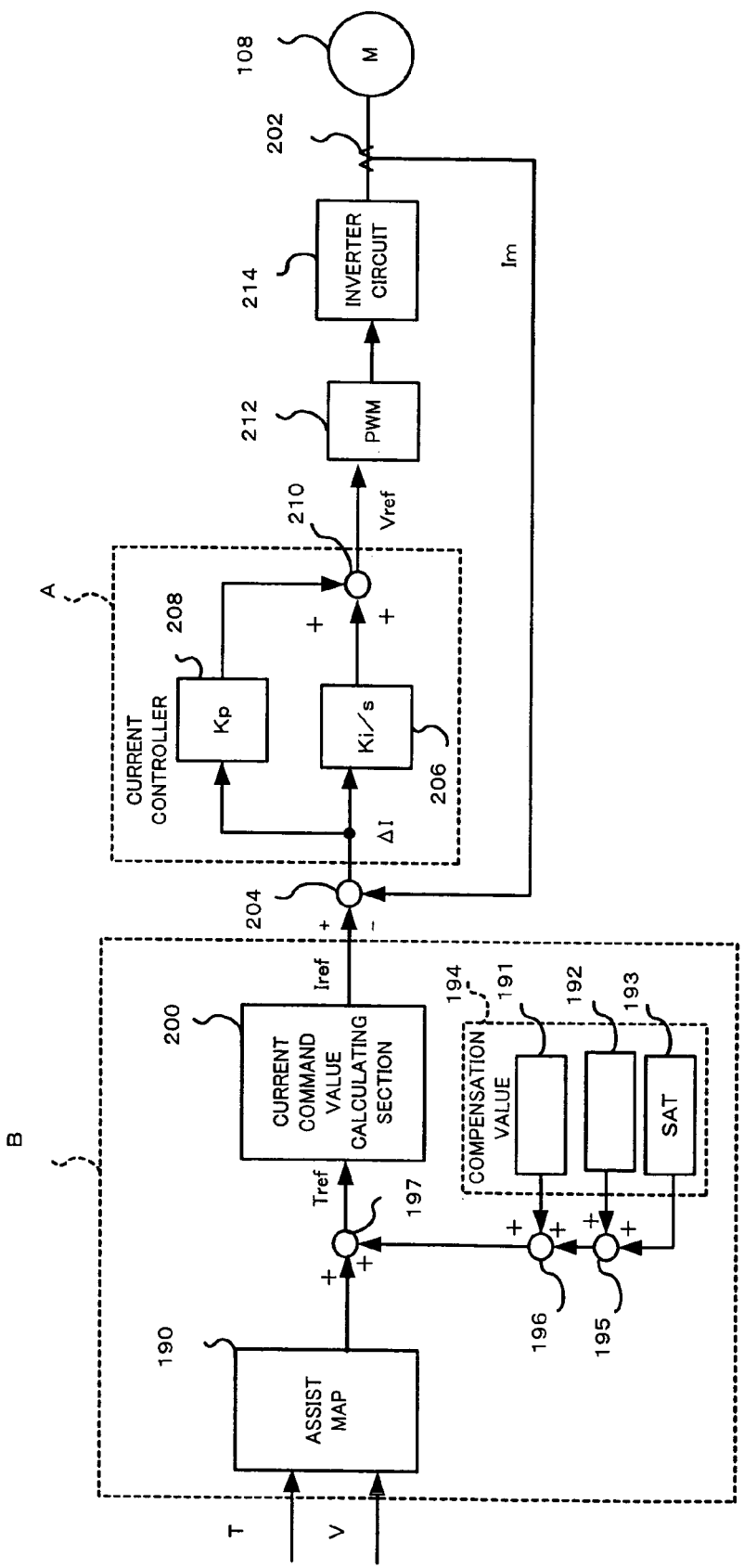
FIG. 2 is a block diagram showing a constitution of a conventional control unit.
Figures 10A, 10B:
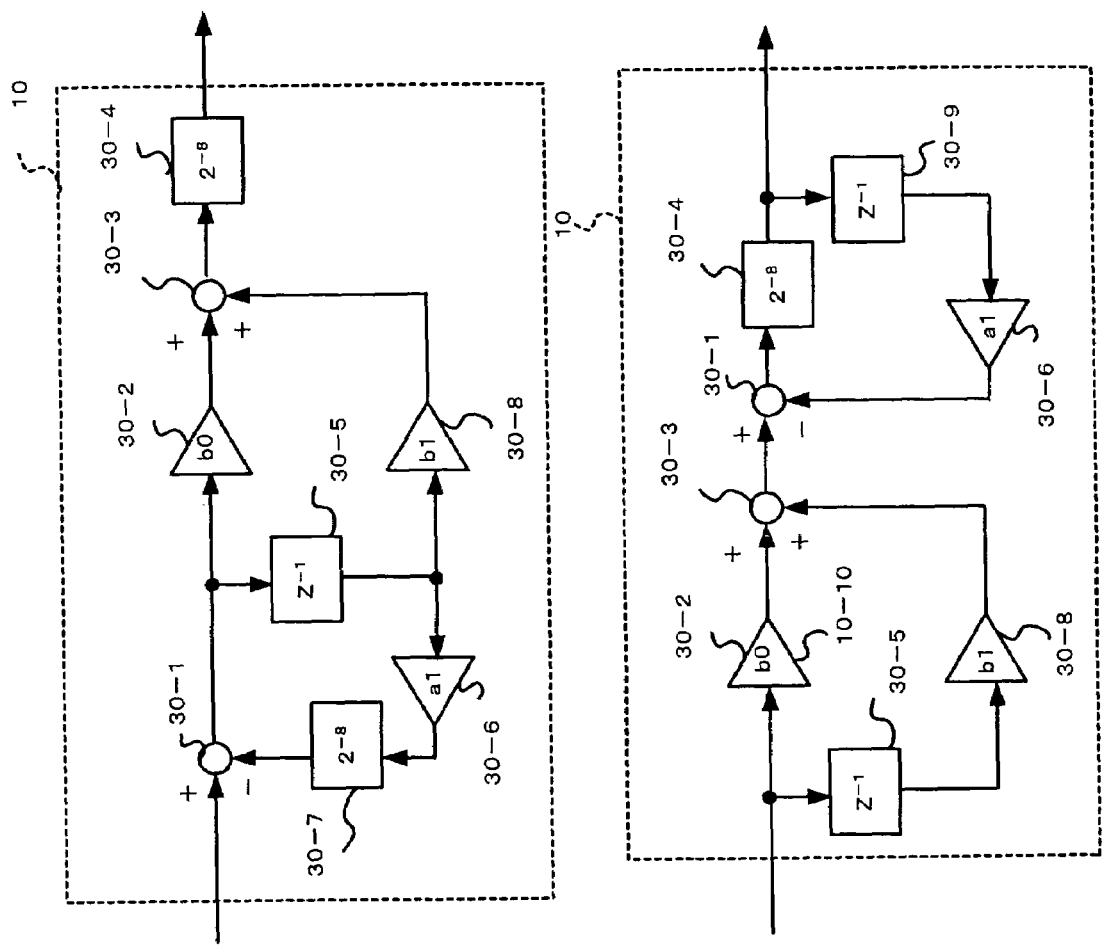
FIGS. 10A and 10B are respectively block diagrams showing constitutional example of a smoothing filter.

FIG. 10A is a discrete expression of the function "K/(T2·s+1)" which is one embodiment of the smoothing filter 10, and FIG. 10B is a configurational example of the function "K/(T2·s+1)" which is more preferable in operating accuracy. In FIG. 1A, the input from the smoothing filter 10 is inputted to a subtracter 30-1 and its output is inputted to a lag unit 30-5 and a gain unit 30-2 of a gain "b0". An output from the lag unit 30-5 is inputted to a gain unit 30-6 of a gain "a1" and a gain unit 30-8 of a gain "b1". An output from the gain unit 30-6 is inputted to a shift unit 30-7 and is rounded by $2^{-8}$ so as to be the other input of the subtracter 30-1.

On the other hand, an output from the gain unit 30-2 and an output from the gain unit 30-8 are added by an adder 30-3, and an output from the adder 30-3 is rounded by $2^{-8}$ in the shift unit 30-4 so as to be outputted. In the smoothing filter 10, since after the shift unit 30-7 executes rounding by $2^{-8}$, the subtracter 30-1 and the adder 30-3 execute an addition and a subtraction, its operating accuracy is deteriorated.

On the contrary to the smoothing filter in FIG. 10A, the smoothing filter in FIG. 10B is an embodiment where the operating accuracy is improved. In FIG. 10B, the input of the smoothing filter 10 is inputted to the gain unit 30-2 of the gain "b0" and the lag unit 30-5. An output from the lag unit 30-5 is inputted to the gain unit 30-8 of the gain "b0", and the output from the gain unit 30-8 and the output from the gain unit 30-2 are added by the adder 30-3.

An output from the adder 30-3 is inputted to the subtracter 30-1. An output from the subtracter 30-1 is Inputted to the shift unit 30-4, and is rounded by $2^{-8}$. An output from the shift unit 30-4 is an output in the smoothing filter 10, but it is used also as an input of the lag unit 30-9. An output from the lag unit 30-9 is inputted to the gain unit 30-6 of the gain a1, and an output from the gain unit 30-6 is the other input in the subtracter 30-1.

When the smoothing filter 10 in FIG. 10B is compared with the smoothing filter in FIG. 10A, a number of the lag units is increased by one (the lag unit 30-9), but the shift unit 30-7 is removed, and thus the addition and subtraction can be executed with a large scale, thereby producing an excellent effect of satisfactory accuracy.

Embodiment-7

Figure 11:
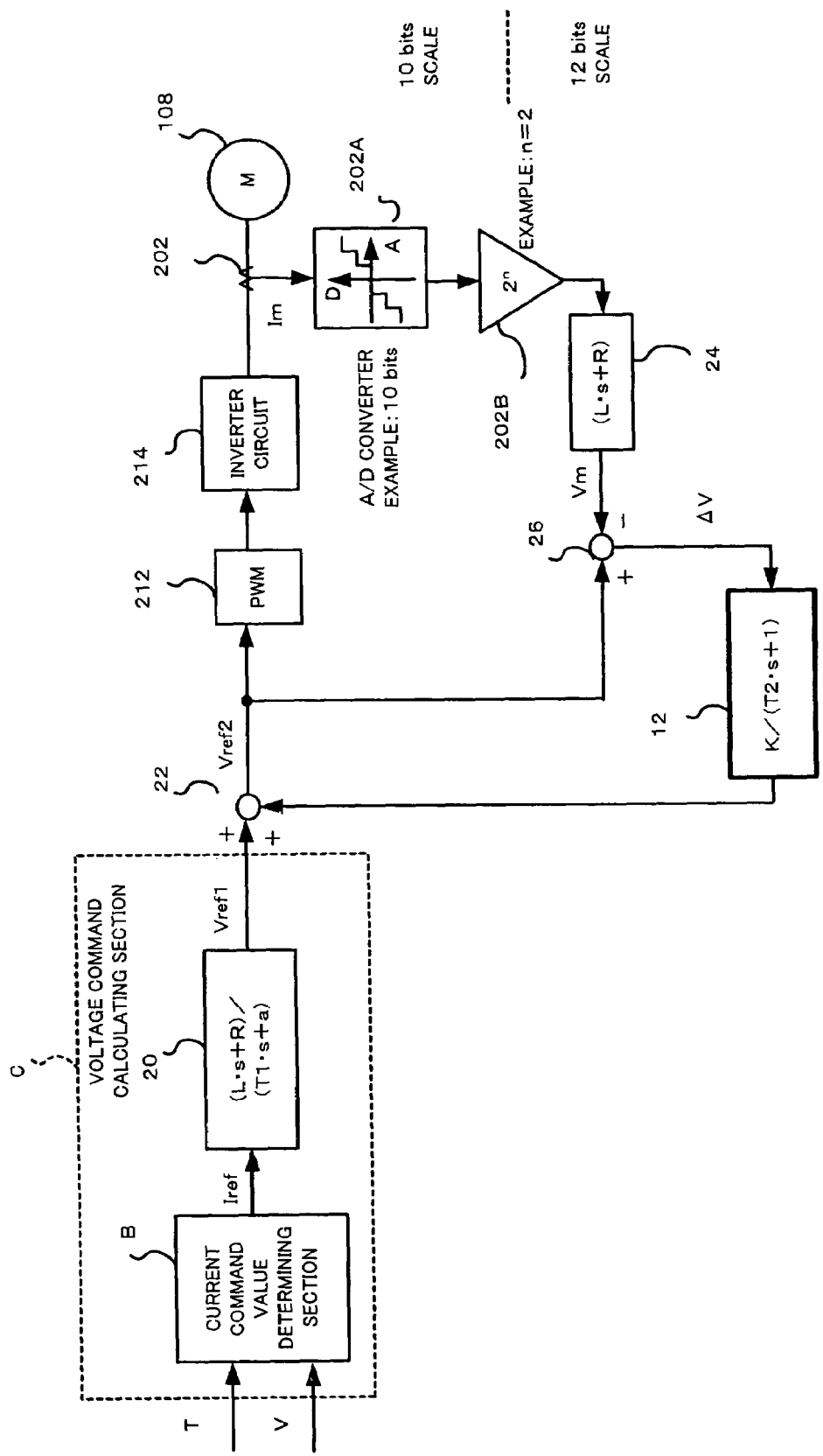
FIG. 11 is a block diagram showing the embodiment-7 of a control unit of the electric power steering apparatus according to the present invention.

With reference to FIG. 11, another embodiment-7 of the present invention is explained. The embodiment-6 in FIG. 9 is feedback control of the motor current Im, but the present embodiment-7 in FIG. 11 is control where feed-forward and disturbance observer are combined.

In FIG. 11, the torque value T detected by the torque sensor 107, the vehicle speed V detected by the vehicle speed sensor and the auxiliary value are inputted to the current command value determining section B, and the current command value Iref is determined. The current command value Iref is inputted to a lead/lag function section 20 so that a first voltage command value Vref1 is calculated. A function "$(L \cdot s+R)/(T1 \cdot s+a)$" used as one example of the lead/lag function. "L" designates an inductance value of the motor 108, "R" designates a resistance value of the motor 108, "T1" designates a time constant, and "a" designates a constant. A portion surrounded by a broken line C, where the current command value determining section B and the lead/lag function section 20 are connected in series, is a voltage command value calculating section C.

The first voltage command value Vref1 is the other input in an adding section 22 as an adding unit. The other input in the adding section 22 is an output from the disturbance observer, mentioned later. An output from the adding section 22 is a second voltage command value Vref2. The second voltage command value Vref2 is inputted to a PWM control section 212, the PWM control section 212 outputs the PWM signal based on the second voltage command value Vref2, and the inverter circuit 214 supplies the motor current Im to the motor 108 according to the PWM signal.

The disturbance observer is explained below. After the motor current Im is detected by the current detector 202, the motor current Im is A/D converted by the A/D converter 202A, and its bit scale is raised from 10 bits to the 12 bits by the digit shift section 202B. The motor current Im of 12 bits is inputted to a transmission function section 24 having a transmission function $(L \cdot s+R)$ composed of the inductance value L of the motor 108 as the motor model of the motor 108 and the winding resistance value R of the motor 108, and a motor voltage Vm is calculated as an output from the transmission function section 24 based on the motor current Im. The subtracting section 26 calculates a error ΔV between the motor voltage Vm and the second voltage command value Vref2 as the input value of the PWM control section 212. The smoothing filter 12 as the main section of the present invention, for example, the function "$K/(T2 \cdot s+1)$" is arranged at an output of the subtracter 26, and the output from the smoothing filter 12 becomes the other input in the adding section 22.

In the disturbance observer having such a constitution, when the steering wheel is steered slowly or the steering of the steering wheel is retained, the error ΔV between the second voltage command value Vref2 and the motor voltage Vm derived from the motor current Im detected by the current detector 202 obtains a very small value which is very close to zero (about 1 to 2 bits). Furthermore, the quantization error at the time of quantizing the detected motor current Im is greatly reflected in the motor voltage Vm, and since the error ΔV obtains a very small value, the quantization error has great influence.

When the smoothing filter 12 is not present, a noise at the time of the quantization greatly influences the second voltage command value Vref2, and finally the noise appears as torque ripple of the motor output, thereby bringing discomfort such as vibration and noise of the steering wheel to the driver. Even when the steering wheel is steered slowly or its steering is retained, however, the presence of the smoothing filter 12 smoothes the ripple due to the error ΔV caused by the error at the time of quantizing the detected motor current Im, so that the torque ripple of the motor output can be reduced. As a result, the vibration and noise of the steering wheel can be greatly reduced.

Embodiment-8

An embodiment-8 where the vehicle speed V and the rotating speed ω of the motor 108 are added to the embodiments 6 and 7 so that the high-speed steering property of the electric power steering apparatus is improved is explained below. A degree of the discomfort due to the vibration and noise of the steering wheel which an driver and fellow passengers feel varies according to the vehicle speed and the rotating speed of the motor. That is to say, when the vehicle runs at a high speed or the motor rotates at a high speed, the operator and fellow passengers are not much worried about the vibration and noise, but when the vehicle runs at a low speed or the motor rotates at a low speed, they feel discomfort about the vibration and noise of the steering wheel.

When the vehicle speed is high and the rotating speed of the motor is high, parameters of the smoothing filter are adjusted so that a degree of smoothing is reduced, and a high response speed is secured. As a result, the degree of suppression the vibration and noise on the steering wheel is reduced, thereby securing the high-speed steering of the steering wheel. Meanwhile, when the vehicle runs at a low speed or the motor rotates at a low speed, the driver and the fellow passengers sensitively feel the vibration and noise generated on the steering wheel. For this reason, the parameters of the smoothing filter are adjusted so that the degree of the smoothing is heightened, and the control is made so as to emphasize the control of the vibration and noise in comparison with the high-speed steering of the electric power steering apparatus.

Figure 12:
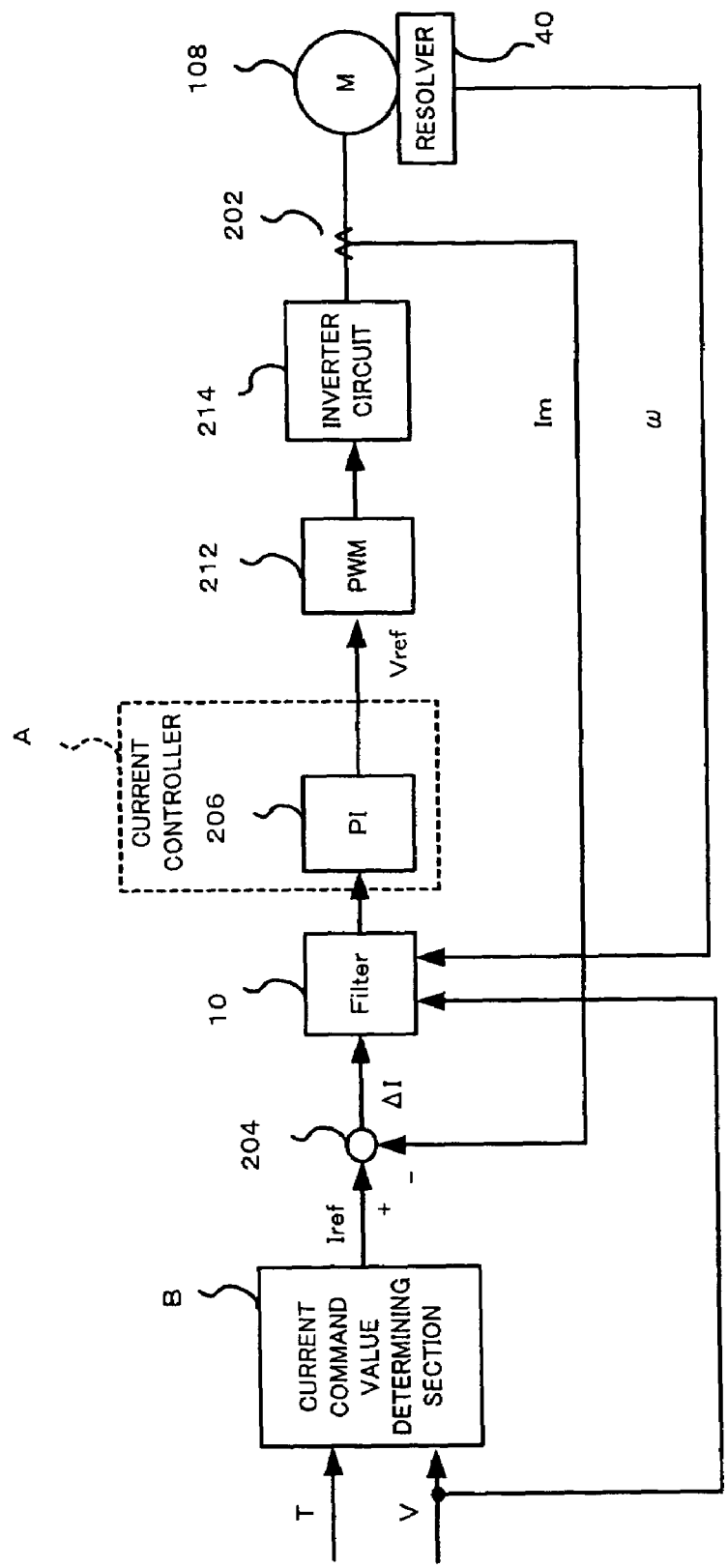
FIG. 12 is a block diagram showing the embodiment-8 of a control unit of the electric power steering apparatus according to the present invention where a vehicle speed or the like is taken into consideration.

Concretely, an embodiment where the vehicle speed V and the rotating speed ω of the motor 108 are added to the embodiment 6 is the embodiment-8 shown in FIG. 12. In FIG. 12, a resolver 40 is arranged at the motor 108 so as to detect an angular velocity ω as the rotating speed of the motor 108. Meanwhile, the vehicle speed V can be detected by the vehicle speed sensor. The parameters of the smoothing filter 10 are adjusted according to the vehicle speed V and the angular velocity ω of the motor 108. When the smoothing filter 10 is composed of, for example, a first order lag function "$K/(T2 \cdot S+1)$", a gain K and a time constant T2 as the parameters are set so that a cutoff frequency becomes high when the vehicle speed V and the angular velocity ω are high, so that the degree of the smoothing is weakened and the parameters of the smoothing filter 10 are set so as to emphasize the high-speed steering of the electric power steering apparatus. On the other hand, when the vehicle speed V and the rotating angular velocity ω of the motor 108 are low, the gain K and the time constant T2 are set so that the cutoff frequency becomes low so as to be emphasize the smoothing of the quantization error which is the cause of the suppression of the vibration and noise of the steering wheel. Further, it is effective that the gain K is set so that K<1. When the parameters of the smoothing filter 10 are adjusted in such a manner, the high-speed steering of the electric power steering apparatus can be compatible with the suppression of the vibration and noise on the steering wheel.

Embodiment-9

Figure 13:
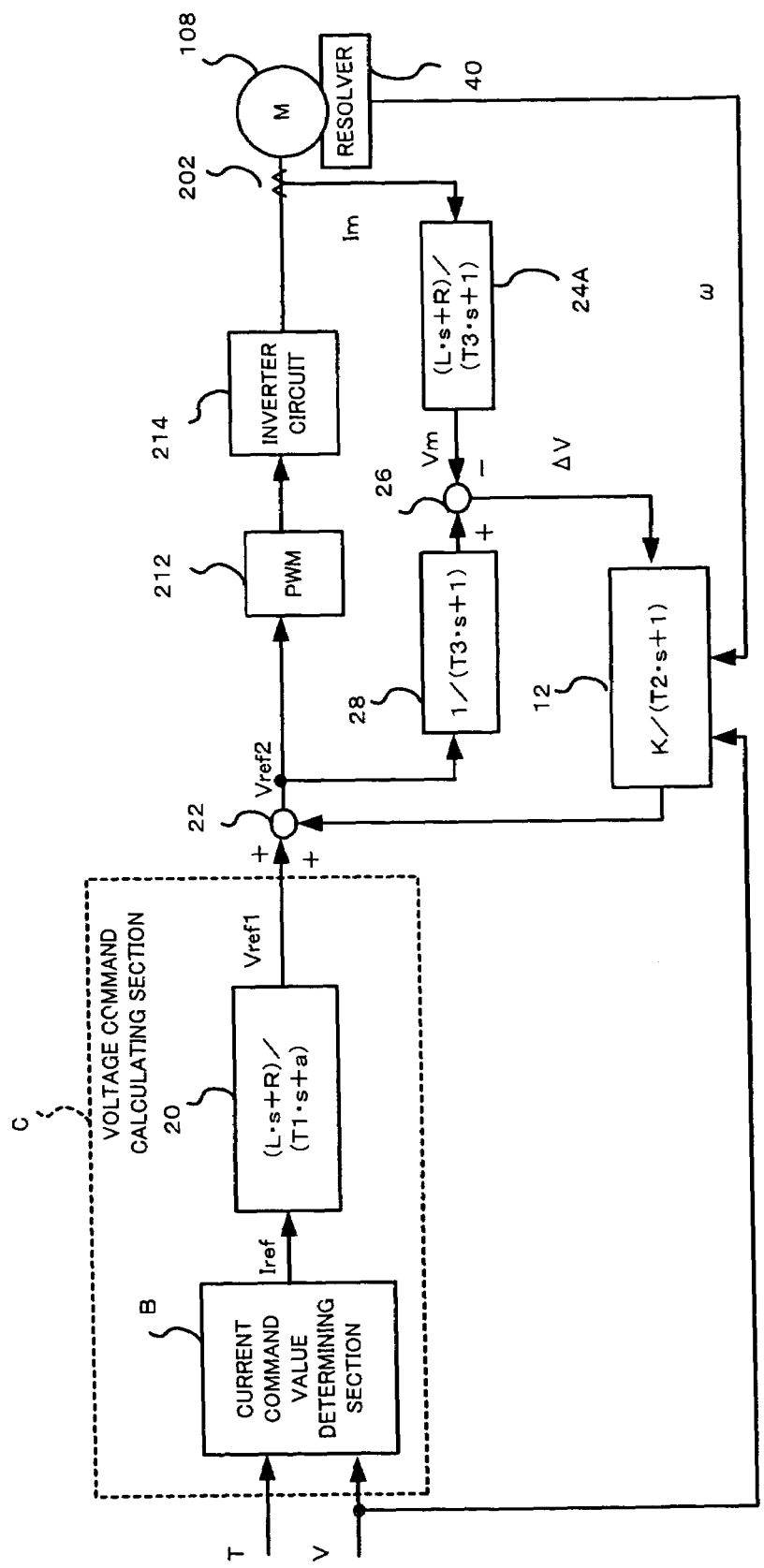
FIG. 13 is a block diagram showing the embodiment-9 of a control unit of the electric power steering apparatus according to the present invention where a vehicle speed or the like is taken into consideration.

An embodiment where the vehicle speed V and the rotating speed ω of the motor 108 are added to the embodiment 7 is an embodiment-9 shown in FIG. 13. The vehicle speed V detected by the vehicle speed sensor and the angular velocity ω of the motor detected by the resolver 40 are inputted to the smoothing filter 12 (the function is $K/(T2 \cdot s+1)$), so that the gain K and the time constant T2 as the parameters of the smoothing filter 12 are adjusted as mentioned above. The adjustment of the parameters can make the high-speed steering of the electric power steering apparatus compatible with the suppression of the vibration and noise on the steering wheel. A first order lag function "1/(T3·s+1)" is present in the denominator of a transmission function section 24A (function=(L·s+R)/(T3·s+1)) and a transmission function section 28 (function (1/(T3·s+1)) which are not present in the Embodiment-7. Since the Embodiment-7, however, refers to the explanation which emphasizes the principle, the first order lag function is omitted, but the first order lag function "1/(T3·s+1)" as the noise filter is generally present.

As explained above, the present invention can provide the excellent electric power steering apparatus in which the torque ripple caused by the quantization error of the current control system caused in case of slow steering state or steering holding state, namely, the vibration and noise on the steering wheel can be suppressed.

According to the electric power steering apparatus of the present invention (Embodiments-6 to -9), the error between the current command value and the motor current is very small in case of slow steering state or steering holding state. For this reason, even if a quantization error caused at the time of quantization of the detected motor current is greatly reflected in the error, the smoothing filter smoothes the error so that the error is not output as torque ripple of the motor, thereby preventing vibration and noise at the time of operating the steering wheel from being generated.

Further, according to the electric power steering apparatus of the present invention, the error between the second voltage command value and a motor voltage calculated from the motor current is very small in case of slow steering state or steering holding state. For this reason, even if a quantization error caused at the time of quantization of the detected motor current is greatly reflected in the error, the smoothing filter smoothes the error so that the error is not output as torque ripple of the motor, thereby preventing the vibration and noise at the time of operating the steering wheel from being generated.

Further, the parameters of the smoothing filter are adjusted according to the vehicle speed and the rotating speed of the motor. As a result, the vibration and noise of the steering wheel in case of the slow steering state and steering holding state at the low speed of the vehicle are suppressed, and simultaneously high-speed steering at the high-speed of the vehicle can be carried out.

One point of an electric power steering apparatus of the present invention is that at least one of a torque T, a current command value Iref, a vehicle speed V, a motor angle θ and a rotating angular velocity ω of the motor is used as an input parameter of a steering state detecting section. The steering state detecting section detects a steering state, and current control responsiveness is changed according to the detected steering state (a steering holding state or a normal steering state).

Another point of the present invention is that in the case where the current control responsiveness is changed according to the steering holding state or the normal steering state, as explained concretely, when a gain is switched between a gain in the steering holding state of the current control section (hereinafter, referred also as a "steering holding state gain") and a gain in a normal steering state of the current control section (hereinafter, referred also as a "normal steering gain"), the gain is gradually adjusted.

Preferable embodiments of the present invention are explained below with reference to the drawings.

Embodiment-10

Figure 14:
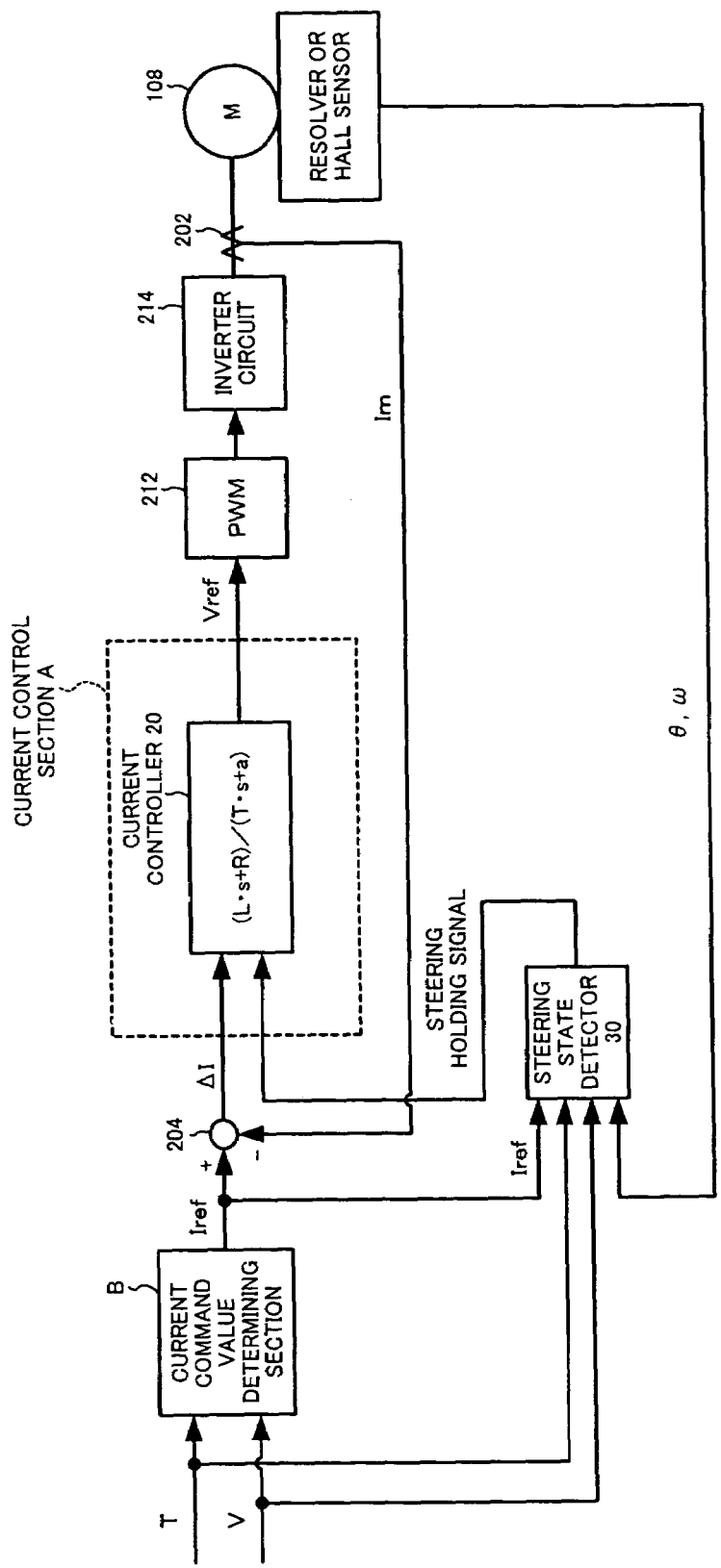
FIG. 14 is a block diagram showing the embodiment-10 of a control unit of the electric power steering apparatus according to the present invention.

FIG. 14 illustrates a block diagram of an electric power steering apparatus according to an Embodiment-10.

Firstly, an entire constitution of the electric power steering apparatus according to the Embodiment-10 is explained. As shown in FIG. 14, a current command value determining section B inputs a torque value T detected by a torque sensor 107 and a vehicle speed V detected by a vehicle speed sensor and determines a current command value Iref. Meanwhile, a motor current Im to be supplied to a motor 108 is detected by a current detector 202, the motor current Im is inputted together with the current command value Iref to a subtracting section 204. The subtracting section 204 calculates their error ΔI=Iref−Im.

The error ΔI and a steering holding state signal which is outputted from a steering state detector 30 as one example of a steering state detecting section if it is present are inputted to a current control section A (in this embodiment, a current controller 20). As a concrete example, the current controller 20 is comprised of a lead/lag function. As one example of the lead/lag function, (L·s+R)/(T·s+a) is used.

Next, the steering state detector 30 is explained. The steering state detector 30 uses at least one of the torque T, the current command value Iref, the vehicle speed V, a motor angle θ and a rotating angular velocity ω of the motor 108 so as to discriminate a steering state. When a steering holding state is detected, a steering holding state signal is outputted, whereas when a normal steering state is detected, the steering holding state signal is not outputted. Further, a rotor position signal of the motor angle θ and the rotating angular velocity ω can be detected by a rotor position detecting sensor such as a resolver or a Hall sensor.

Current control of the electric power steering apparatus of the present invention is explained below. In the Embodiment-10, the current control section A is comprised of only the current controller 20. The current controller 20 outputs a voltage command value Vref based on presence/non-presence of the steering holding state signal and the error ΔI.

Concretely, when the steering holding state signal is inputted from the steering state detector 30 to the current controller 20, namely, a determination is made that a steering wheel is in the steering holding state, the time constant T of the current controller 20 is increased, so that current control responsiveness is reduced to current control responsiveness of the steering holding state. In other words, a gain of the current control section (hereinafter, referred to also as a "control gain") is reduced from a normal steering state gain to a steering holding state gain.

Meanwhile, when the steering holding state signal from the steering state detector 30 is not present, namely, a determination is made that the steering wheel is in the normal steering state, the time constant T of the current controller 20 is reduced, so that the current control responsiveness is returned to the current control responsiveness of the normal steering state. In other words, the gain (control gain) of the current controller 20 is raised from the steering holding state gain to the normal steering gain.

A PWM control section 212 inputs the voltage command value Vref as an output from the current controller 20 therein, and outputs a PWM signal to an inverter circuit 214 so as to instruct the PWM signal based on the voltage command value Vref to the inverter circuit 214. The inverter circuit 214 supplies the motor current Im to the motor 108 based on the PWM signal.

In the electric power steering apparatus having the constitution shown in FIG. 14, when the time constant T of the current controller 20 is changed according to the steering state of the steering wheel, the current control responsiveness is changed. That is to say, when the determination is made that the steering wheel is in the steering holding state, the gain (control gain) of the current controller 20 is switched into the steering holding state gain having small value, thereby securing a steering holding noise performance (a performance that the steering holding noise is not generated). Meanwhile, when the determination is made that the steering wheel is in the normal steering state, the gain (control gain) of the current controller 20 is switched into the normal steering gain having large value, thereby securing a steering performance.

Embodiment-11

Figure 15:
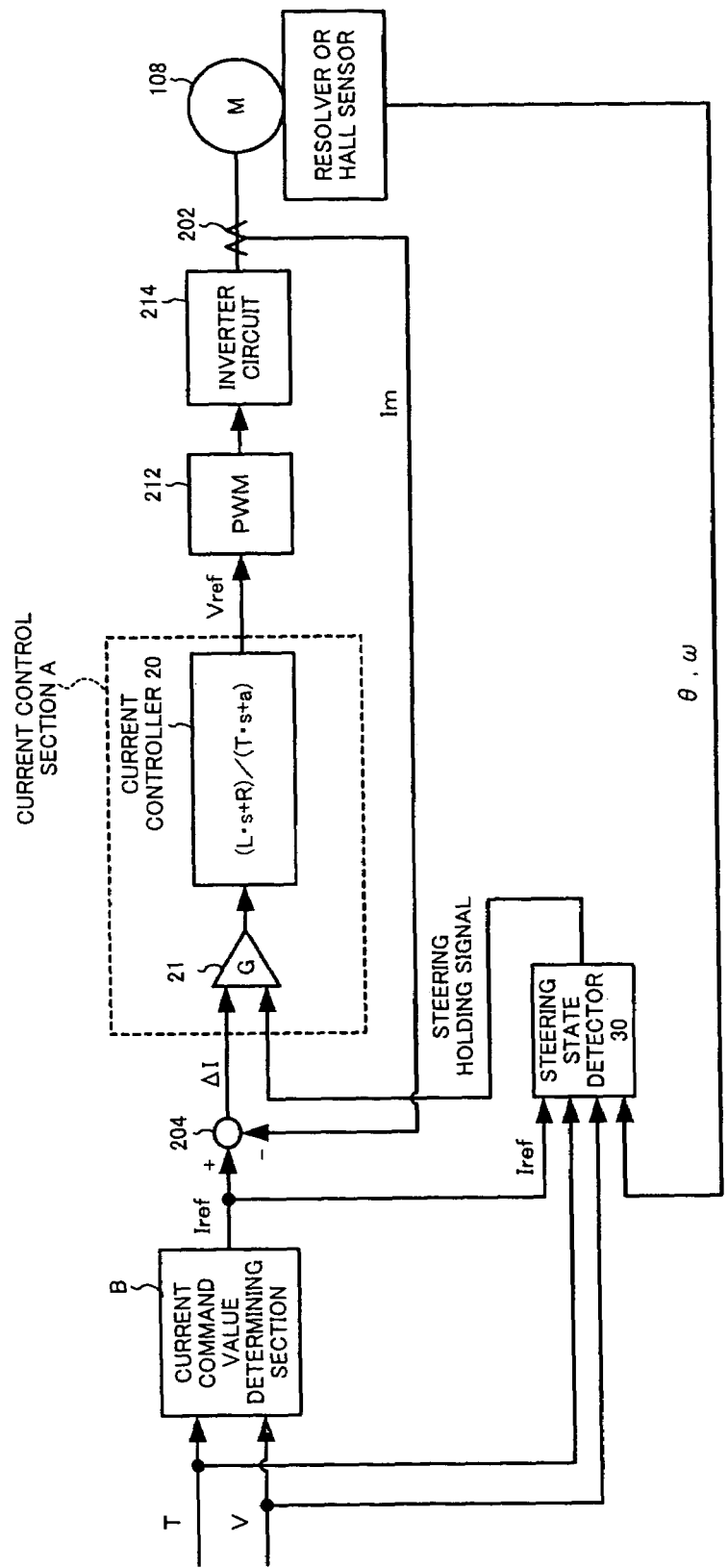
FIG. 15 is a block diagram showing the embodiment-11 of a control unit of the electric power steering apparatus according to the present invention.

FIG. 15 illustrates a block diagram of the electric power steering apparatus according to an Embodiment-11.

As shown in FIG. 15, a difference of the electric power steering apparatus according to the Embodiment-11 from the electric power steering apparatus according to the Embodiment-10 is only a portion of the current control section A. Only the current control section A in the Embodiment-11 is, therefore, explained. As to the explanation about the other portions of the electric power steering apparatus according to the Embodiment-11, the explanation in the Embodiment-10 is referred to.

As shown in FIG. 15, in the electric power steering apparatus according to the Embodiment-11, a gradual adjustment gain section 21 is provided between the subtracting section 204 and the current controller 20.

The current control in the electric power steering apparatus of the Embodiment-11 is explained. In the Embodiment-11, the current control section A is comprised of the current controller 20 and the gradual adjustment gain section 21. The current control section A outputs the voltage command value Vref based on the presence/non-presence of the steering holding state signal and the error ΔI.

Concretely, when the steering holding state signal is inputted from the steering state detector 30 to the current controller 20, namely, a determination is made that the steering wheel is in the steering holding state, the gain G of the gradual adjustment gain section 21 is decreased, so that current control responsiveness is reduced to current control responsiveness of the steering holding state. In other words, the gain (hereinafter, referred to also as a "control gain") of the current control section A is reduced from the normal steering gain to the steering holding state gain.

Meanwhile, when the steering holding state signal from the steering state detector 30 is not present, namely, a determination is made that the steering wheel is in the normal steering state, the gain G of the gradual adjustment gain section 21 is raised, so that the current control responsiveness is returned to the current control responsiveness of the normal steering state. In other words, the gain (control gain) of the current control section A is raised from the steering holding state gain to the normal steering state gain.

In the electric power steering apparatus having the constitution shown in FIG. 15, when the gain G of the gradually adjustment gain section 21 is changed according to the steering state of the steering wheel, the current control responsiveness is changed. That is to say, when the determination is made that the steering wheel is in the steering holding state, the gain (control gain) of the current control section A is switched into the steering holding state gain having small value, thereby securing a steering holding noise performance (a performance that the steering holding noise is not generated). Meanwhile, the determination is made that the steering wheel is in the normal steering state, the gain (control gain) of the current control section A is switched into the normal steering state gain having large value, thereby securing a steering performance.

Embodiment-12

Figure 16:
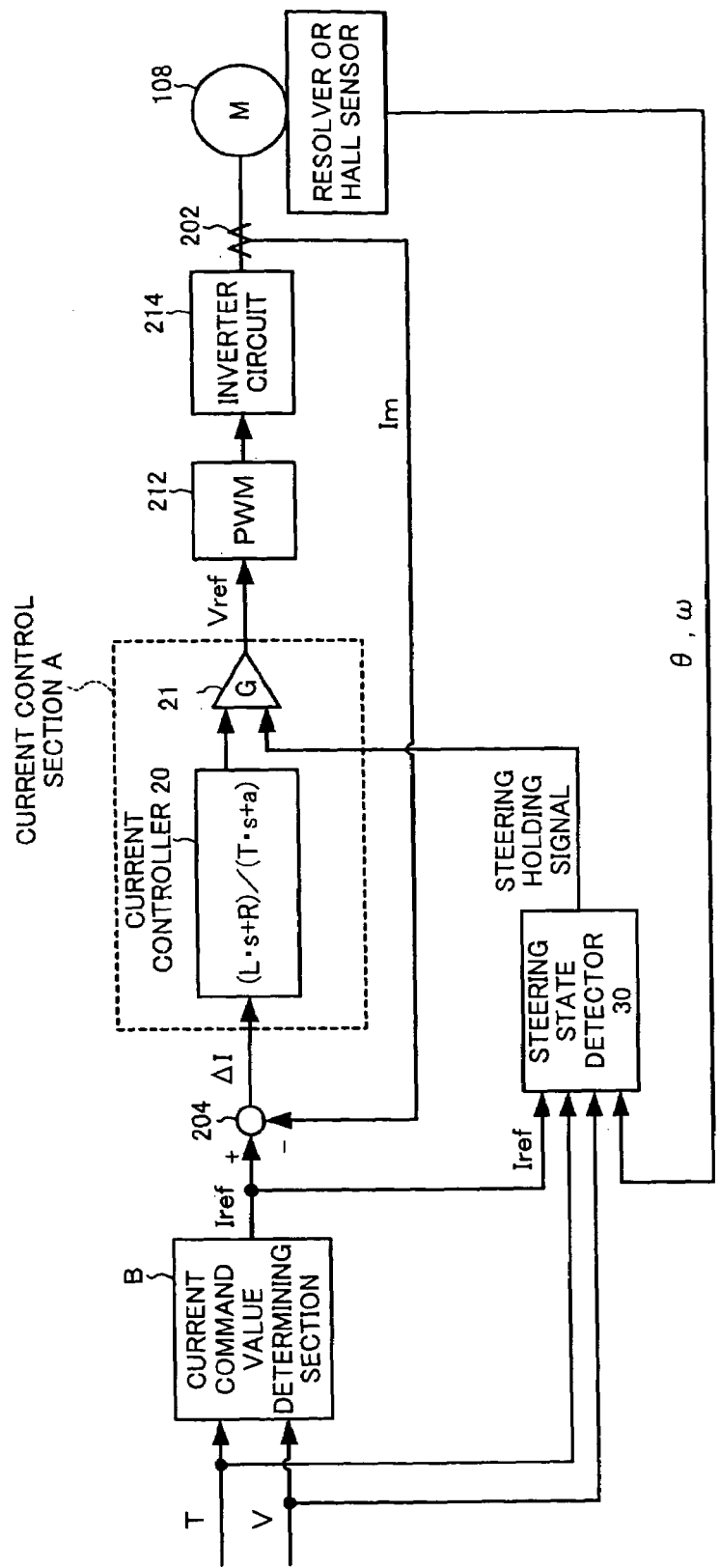
FIG. 16 is a block diagram showing the embodiment-12 of a control unit of the electric power steering apparatus according to the present invention.

FIG. 16 illustrates a block diagram of the electric power steering apparatus according to an Embodiment-12.

As shown in FIG. 16, a difference of the electric power steering apparatus according to the Embodiment-12 from the electric power steering apparatus according to the Embodiment-10 is only a portion of the current control section A. Only the current control section A in the Embodiment-12 is, therefore, explained. As to the explanation about the other portions of the electric power steering apparatus according to the Embodiment-12, the explanation in the Embodiment-10 is referred to.

As shown in FIG. 16, in the electric power steering apparatus according to the Embodiment-12, the gradual adjustment gain section 21 is provided between the current controller 20 and the PWM control section 212.

The current control in the electric power steering apparatus of the Embodiment-12 is explained. In the Embodiment-12, the current control section A is comprised of the current controller 20 and the gradual adjustment gain section 21, but differently from the Embodiment-11, the gradual adjustment gain section 21 is provided on an output side of the current controller 20. The current control section A outputs the voltage command value Vref based on the presence/non-presence of the steering holding state signal and the error ΔI. More accurately, the gradual adjustment gain section 21 outputs the voltage command value Vref.

Concretely, when the steering holding state signal is inputted from the steering state detector 30 to the gradual adjustment gain section 21, namely, a determination is made that the steering wheel is in the steering holding state, the gain G of the gradual adjustment gain section 21 is decreased, so that current control responsiveness is reduced to current control responsiveness of the steering holding state. In other words, the gain (hereinafter, referred to also as a control gain) of the current control section A is reduced from the normal steering state gain to the steering holding state gain.

Meanwhile, when the steering holding state signal from the steering state detector 30 is not present, namely, a determination is made that the steering wheel is in the normal steering state, the gain of the gradual adjustment gain section 21 is raised, so that the current control responsiveness is returned to the current control responsiveness of the normal steering state. In other words, the gain (control gain) of the current control section is raised from the steering holding state gain to the normal steering state gain.

In the electric power steering apparatus having the constitution shown in FIG. 16, when the gain G of the gradual adjustment gain section 21 is adjusted according to the steering state of the steering wheel, the current control responsiveness is adjusted. That is to say, when the determination is made that the steering wheel is in the steering holding state, the gain (control gain) of the current control section A is switched into the steering holding state gain having small value, thereby securing the steering holding noise performance (a performance that the steering holding noise is not generated). Meanwhile, the determination is made that the steering wheel is in the normal steering state, the gain (control gain) of the current control section A is switched into the normal steering gain having large value, thereby securing the steering performance.

Next, a concrete example of a method of adjustment the current control responsiveness in the present invention is explained.

Figure 17:
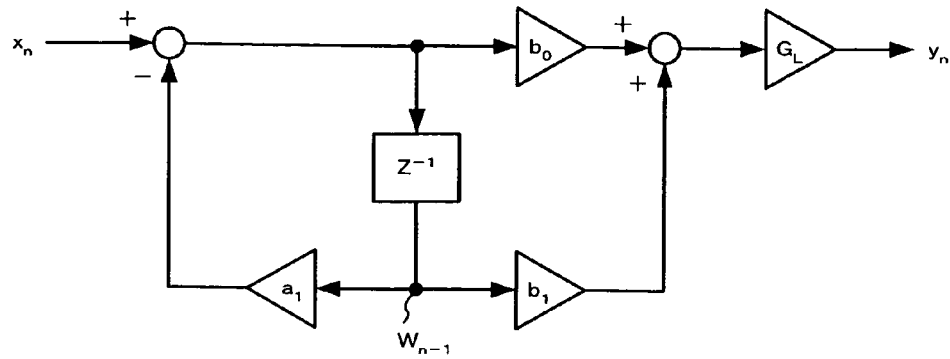
FIG. 17 is a circuit diagram illustrating a concrete example of a current controller in the embodiment-10 of the present invention.

FIG. 17 is a block diagram illustrating a concrete example of the current controller 20 as the current control section A in the Embodiment-10 in FIG. 14. The circuit in FIG. 17 is used so as to be capable of changing the time constant T of the current controller 20. In the current controller 20 to which the circuit shown in FIG. 17 is applied, when an intermediate variable $W_{n-1}$ of the integral element is calculated so that the output becomes constant before and after the change in the current control responsiveness. As a result, even when the current control responsiveness is abruptly changed, the output does not change abruptly.

A concrete example that the intermediate variable $W_{n-1}$ is reset is expressed by the following equations 4 and 5.

$$Y_n = G_L\{b_o(X_n - a_1 W_{n-1}) + b_1 W_{n-1}\} \qquad [\text{Equation 4}]$$
$$= G_L b_o X_n + G_L(b_1 - b_o a_1) W_{n-1}$$

$$W_{n-1} = \frac{Y_n - G_L b_o X_n}{G_L(b_1 - b_o a_1)} \qquad [\text{Equation 5}]$$

In the equation 5, therefore, when the previous output $y_{n-1}$ is substituted into $y_n$, a current output $y_n$ becomes equal with $y_{n-1}$.

Figure 18:
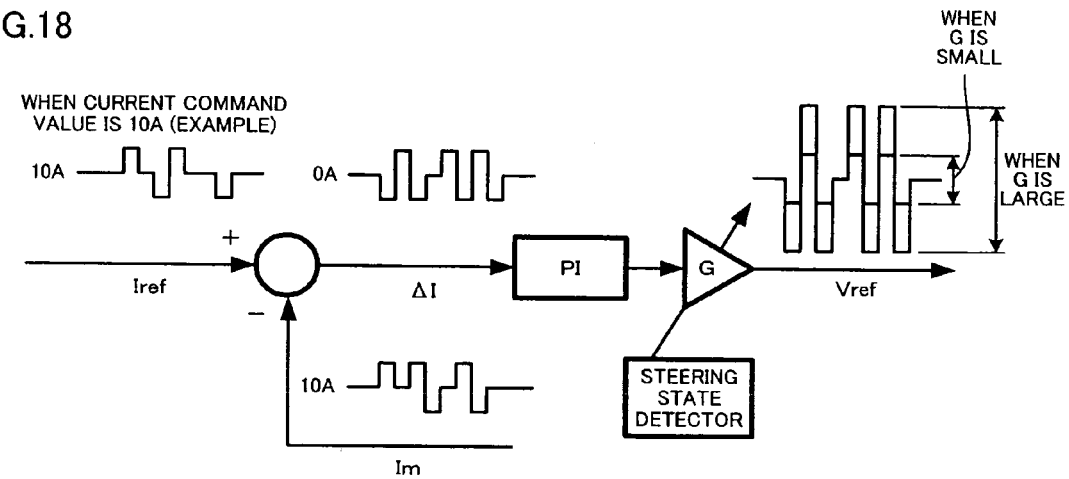
FIG. 18 is a pattern diagram for explaining a change in current control responsiveness in the embodiment-12 of the present invention.

FIG. 18 is a pattern diagram for explaining a changing principle of the current control responsiveness (a switching logic of the current control responsiveness) in the electric power steering apparatus according to the Embodiment-12. As shown in FIG. 18, when, for example, the current command value Iref is 10A, a current waveform shown in the drawing appears, and the current detected value Im has a current waveform like 10A in the drawing. The error ΔI between the current command value Iref and the current detected value Im, therefore, has a current waveform like 0A in the drawing. The error ΔI is inputted to a PI controller, the steering holding state signal from the steering state detector is inputted to the gradual adjustment gain G, and the voltage command value Vref is outputted from the gradual adjustment gain G. When the steering holding state is detected, namely, the steering holding state signal is inputted from the steering state detector to the gradual adjustment gain G, the responsiveness of the current control section is reduced, namely, the gradual adjustment gain G is reduced, so that the vibration is reduced, thereby improving the steering holding noise.

Figure 19:
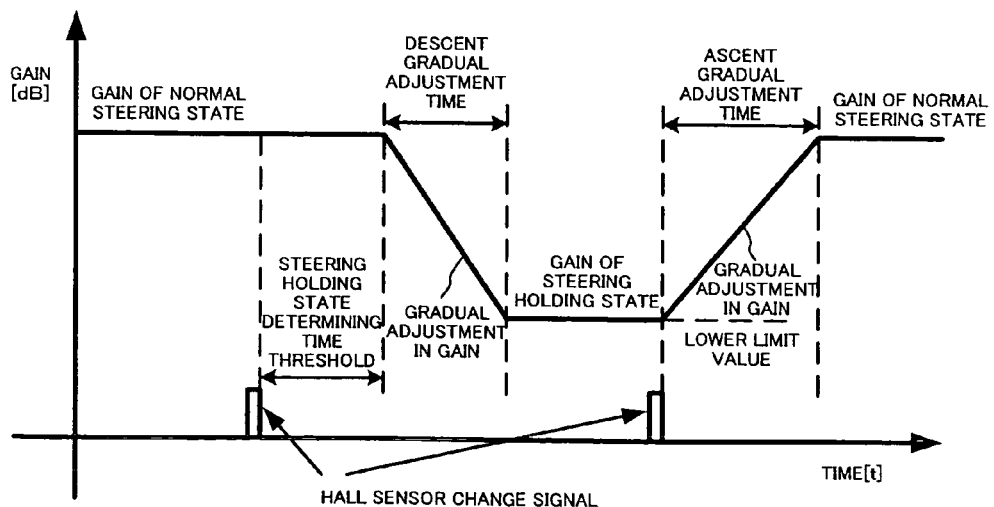
FIG. 19 is a pattern diagram for explaining timing at which a gain of the current control unit is switched and a method of switching the gain in the electric power steering apparatus of the present invention.

FIG. 19 is a pattern diagram for explaining switching timing of the gain and a switching method for the gain in the current control section in the electric power steering apparatus of the present invention. In FIG. 19, a Hall sensor change signal is used so as to detect the steering state.

As shown in FIG. 19, in the normal steering state, at the time when the Hall sensor change signal is detected and a predetermined steering holding state determination time threshold passes, the determination is made that the normal steering state is changed into the steering holding state, and the gain (control gain) of the current control section is reduced from the normal steering state gain to the steering holding state gain along an inclination fixed within predetermined descent gradual adjustment time. Thereafter, this state is retained, and when the Hall sensor change signal is again detected, a determination is made that the steering holding state is changed into the normal steering state, and the gain (control gain) of the current control section is raised from the steering holding state gain to the normal steering gain along an inclination fixed within a predetermined ascent gradual adjustment time. That is to say, in the electric power steering apparatus of the present invention, when the current control responsiveness is changed, namely, the gain (control gain) of the current control section is changed, it is not abruptly changed but the control gain is gradually changed.

Figure 20:
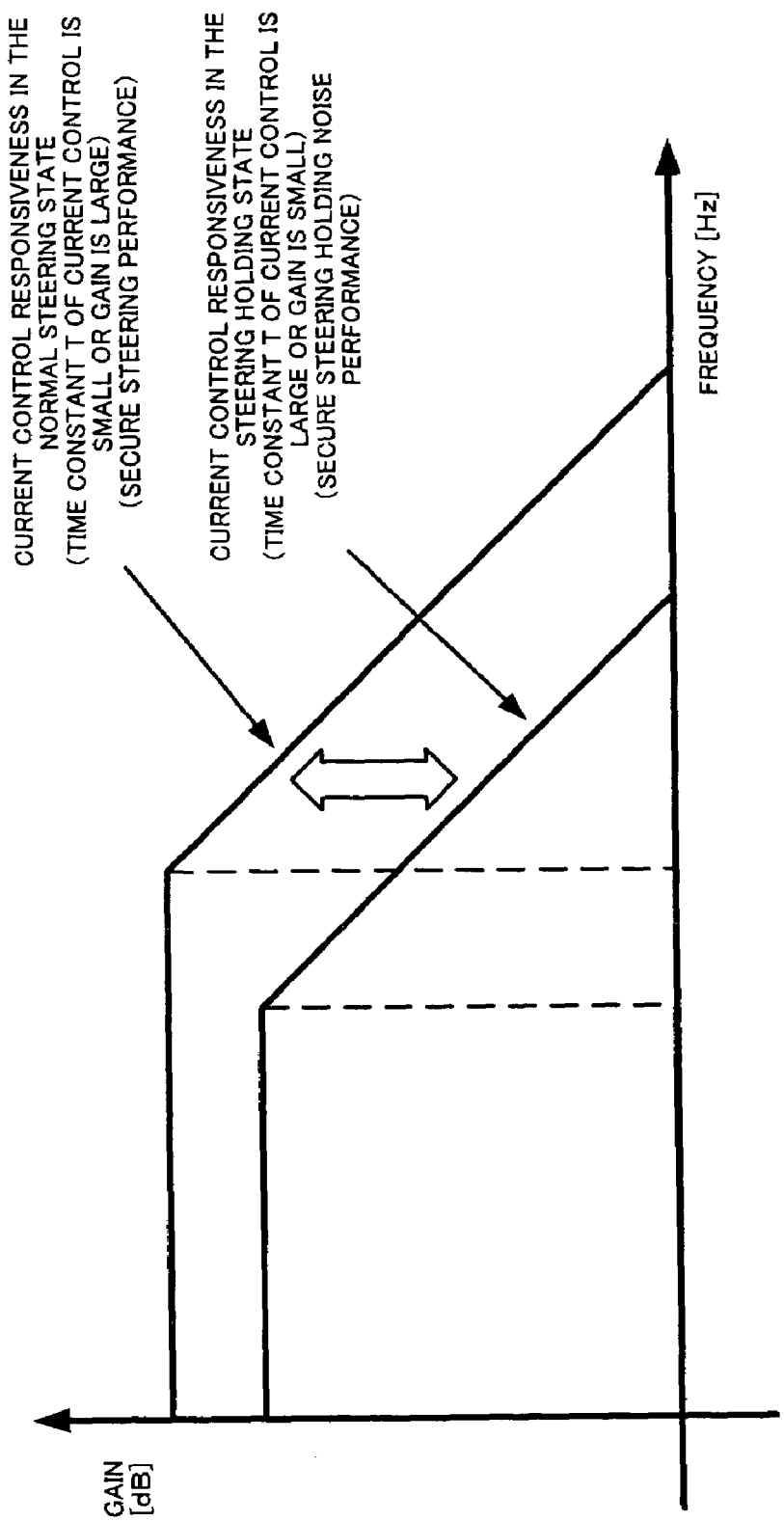
FIG. 20 is a pattern diagram for explaining a frequency characteristic of the current control responsiveness in the electric power steering apparatus of the present invention.

FIG. 20 is a pattern diagram for explaining a frequency characteristic of the current control responsiveness in the electric power steering apparatus of the present invention. As shown in FIG. 20, as the frequency increases, the current control responsiveness in the normal steering state (normal steering state gain) and the current control responsiveness in the steering holding state (steering holding state gain) tend to reduce, but the steering holding state gain is smaller than the normal steering gain in a predetermined frequency. In short, in the electric power steering apparatus of the present invention, the current control responsiveness in the normal steering state (normal steering state gain) secures the steering performance, and the current control response in the steering holding state (steering holding state) secures the steering holding noise performance.

Further, in the present invention, the current control responsiveness in the normal steering state is realized by, for example, reducing the time constant T of the current controller in the Embodiment-10 or increasing the gradual adjustment gain G in the Embodiments-11 and -12. Moreover, the current control responsiveness in the steering holding state is realized by, for example, increasing the time constant T of the current controller in the Embodiment-10 or reducing the gradual adjustment gain G in the Embodiments-11 and -12.

In the Embodiments-11 and -12, when the current controller 20 is comprised of the lead/lag function as a concrete example, the current control responsiveness can be switched in the following manner. As one example of the lead/lag function composing the current controller 20, a function "$(L·s+R)/(T·s+a)$" is used.

That is to say, in the case where the current controller 20 is comprised of the lead/lag function $(L·s+R)/(T·s+a)$, as shown in FIG. 20, a steady state (low frequency) gain is reduced, and when the gain G of the gradual adjustment gain section 21 is reduced, the steady state gain is further reduced, thereby causing decrease in the electric current when the electric current is high. In order to prevent this, in the electric power steering apparatus of the present invention, in the case where the current control responsiveness is switched, when a determination is made that the steering wheel is in the steering holding state, namely, at the time of the steering holding state, the gain G of the gradual change gain section 21 is gradually changed to a small value, and accordingly the value of the constant "a" (>0) is gradually changed to zero or a small value. Further, in the case where a determination is made that the steering wheel is in the normal steering state, namely, the steering holding state is returned to the normal steering state, similarly the gain G of the gradual adjustment gain section 21 which is small is gradually adjusted to an original value, and accordingly the value of the constant "a" which is small is gradually adjusted to an original value.

As mentioned above, the steering state detector of the present invention uses at least one of the torque T, the current command value Iref, the vehicle speed V, the motor angle θ and the rotating angular velocity ω of the motor so as to discriminate the steering state. That is to say, when detecting the steering holding state, the steering state detector of the present invention outputs the steering holding state signal to the current control section, whereas when detecting the normal steering state, it outputs no signal to the current control section.

In the present invention, steering holding state determining conditions, which are concrete conditions for determining that the steering state is switched from the normal steering state into the steering holding state in the steering state detector 30 as the steering state detecting section, are explained below.

For example, the steering state determining conditions include the followings.
(A1) A derivative value (difference in sampling period) of the torque T is not more than a predetermined value.
(A2) The torque T belongs to a predetermined value range. That is to say, "$T_1<T<T_2$" is established.
(A3) The vehicle speed V is not more than a predetermined value. For example, at the time when $V \leq 8$ kph.
(A4) At the time when the motor angle θ does not change, namely, a signal from the sensor for detecting the motor angle does not change. For example, in the case where the Hall sensor is used as the motor angle sensor, a Hall IC pattern duration time $\geq 0.2$ sec.
(A5) The derivative value of the motor angle θ is not more than a predetermined value.
(A6) The rotating angular velocity ω of the motor is not more than a predetermined value.
(A7) The current command value Iref belongs to a predetermined value range. That is to say, "$Iref_1<Iref<Iref_2$" is established. For example, at the time when 2A<Iref<93A.

That is to say, some determining conditions in the steering state determining conditions (A1 to A7) are combined so that a logical product is taken, and when its result is "TRUE", the steering state detector determines that the steering state is switched from the normal steering state into the steering holding state so as to output the steering holding state signal to the current control section.

In the case other than the steering state determining conditions (A1 to A7), or in the case where the result of the logical product is "FALSE", the steering state detector determines that the steering state is returned from the steering holding state to the normal steering state, so as not to output the steering holding state signal.

For example, when the vehicle speed V is high, in order to secure the steering performance at the time of running, the current control responsiveness is always in the normal steering state. Further, when the current command value Iref is small, in order to secure the steering performance near a steering wheel neutral position (position of the steering wheel in a vehicle running straight ahead), the current control responsiveness is returned from the current control responsiveness in the steering holding state to the current control responsiveness in the normal steering state. Further, in the case where the current command value Iref is large, for example in the electric power steering apparatus of FIG. 14, when "a" in the current controller 20 has some values, the gain is reduced by reducing the current control responsiveness, and the reduction in the output is large in a large current area. For this reason in case of large current command, the current control responsiveness is returned from the current control responsiveness of the steering holding state to the current control responsiveness of the normal steering state.

In the above explanation, it goes without saying that the effects of the present invention (Embodiments-10 to -12) can be obtained even in the case where the motor to be used in the electric power steering apparatus is a single-phase motor, a three-phase motor, or the current control of the motor is three-phase control, d-q axis control in the case of the three-phase motor.

According to the electric power steering apparatus of the present invention, at least one of the torque T, the current command value Iref, the vehicle speed V, the motor angle θ and a rotating angular velocity ω of the motor is used so that the steering state is discriminated, and the current control responsiveness is changed according to the discriminated steering state. For this reason, the vibration and holding noise of the steering wheel in case of steering holding state can be remarkably reduced, and a steering performance at the time of the normal steering is secured, thereby obtaining satisfactory steering feeling.

In addition, in the electric power steering apparatus of the present invention, in the case where the current control responsiveness is changed according to the steering state, namely, the steering holding state or the normal steering state, as explained more concretely, a gain of the current control section is switched between a gain of the steering holding state and a gain of the normal steering state, the gain is gradually changed. For this reason, even if the steering is started from the steering holding state or the steering is started from the normal steering state, a steering assist power can be prevented from reducing or increasing abruptly, thereby further improving the steering feeling.

What is claimed is:
1. An electric power steering apparatus, comprising:
a motor that applies a steering assist torque to a steering system of a vehicle; a torque sensor that detects a steering torque which acts on a steering wheel; and a current detector that detects a current value of the motor,
wherein the motor is controlled based on an output from a current controller for inputting an error between a current command value to be determined based on an output value from the torque sensor and a current value of the motor thereinto, and
a steady state gain of the current controller is a finite value.

2. An electric power steering apparatus according to claim 1, wherein the current controller is comprises of at least a proportional function and a first order lag function.

3. An electric power steering apparatus according to claim 1, wherein the current controller is comprised of a lead/lag function.

4. An electric power steering apparatus according to any one of claims 1 to 3, wherein the gain of the current controller is adjusted based on a vehicle speed or a rotational angular velocity of the motor.

5. An electric power steering apparatus according to of claims 1, wherein a phase compensator is arranged before the current controller.

6. An electric power steering apparatus comprising:
a motor that applies a steering assist torque to a steering system of a vehicle; a torque sensor that detects a steering torque which acts on a steering wheel; a current detector that detects a current value of the motor; a current command value determining section that calculates a current command value to be determined based on an output value from the torque sensor; an error calculating section that calculates an error between the current command value and the current value of the motor; a smoothing filter that inputs the error; and a current control section including an integral element that inputs an output from the smoothing filter therein, wherein the motor is controlled based on an output value from the current control section.

7. An electric power steering apparatus comprising: a motor that applies a steering assist torque to a steering system of a vehicle; a torque sensor that detects a steering torque which acts on a steering wheel; a current detector that detects a current value of the motor; a voltage command value calculating section that calculates a first voltage command value Vref1 based on an output value from the torque sensor; a smoothing filter that inputs an error between a motor voltage to be calculated from the motor current and a model of the motor and a second voltage command value therein; and an adding unit that adds an output value from the smoothing filter and the first voltage command value so as to calculate the second voltage command value.

8. An electric power steering apparatus according to any one of claims 6 to 7, wherein parameters of the smoothing filter are adjusted according to a speed of the vehicle or a rotating speed of the motor.

9. An electric power steering apparatus comprising: a motor that applies a steering assist torque to a steering system of a vehicle; a torque sensor that detects a steering torque which acts on a steering wheel; a current command value determining section that determines a current command value based on a vehicle speed and a torque as an output value from the torque sensor; a current detecting section that detects a motor current; a current control section that outputs a voltage command value; and a steering state detecting section that detects a steering state of the steering wheel, outputs a steering holding state signal to the current control section when a steering holding state is detected, and does not output the steering holding state signal when a normal steering state is detected, wherein the current control section inputs an error between the current command value and the motor current, switches current control responsiveness according to the steering state detected by the steering state detecting section, and determines the voltage command value based on the current control section of the switched current control responsiveness and the error.

10. An electric power steering apparatus according to claim 9, wherein the steering state detecting section uses at least one of the torque, the current command value, the vehicle speed, a rotating speed of the motor and a rotating angular velocity of the motor so as to detect the steering state.

11. An electric power steering apparatus according to claim 10 wherein the current control section is comprised of a current controller, and adjusts a time constant of the current controller so as to switch the current control responsiveness.

12. An electric power steering apparatus according to claim 10 wherein the current control section is comprised of a current controller and a gradual adjustment gain section, and adjusts a gain of the gradual adjustment gain section so as to switch the current control responsiveness.

13. An electric power steering apparatus according to claim 12, wherein in the current control section, the gradual adjustment gain section is arranged at an input side of the current controller.

14. An electric power steering apparatus according to claim 12, wherein in the current control section, the gradual adjustment gain section is arranged at an output side of the current controller.

15. An electric power steering apparatus according to any one of claims 11 to 14, wherein the current controller is comprised of a lead/lag function.

16. An electric power steering apparatus according to any one of claims 12 to 14, wherein
in the current control section, the current controller is comprised of a lead/lag function $(L \cdot s+R)/(T \cdot s+a)$, where "L" designates an inductance value of the motor. "s" a Laplace operator, "R" a resistance value of the motor, "T" a time constant of a filter and "a" a constant, the gain of the gradual adjustment gain section is gradually adjusted, so that the current control responsiveness is switched.

17. An electric power steering apparatus according to claim 16, wherein in the current control section, when the gain of the gradual adjust gain section is gradually adjusted into small values in the steering holding state, accordingly the constant "a" is gradually adjusted into "0" or small values, and when the gradual adjustment gain which becomes small is gradually adjusted into an original value in the normal steering state, accordingly the constant "a" which is small is gradually adjusted into an original value.

* * * * *